(12) United States Patent
Sano et al.

(10) Patent No.: US 10,093,802 B2
(45) Date of Patent: *Oct. 9, 2018

(54) MOLDING MATERIAL, METHOD OF PRODUCING SAME, AND MASTER BATCH USED IN SAME

(71) Applicant: Toray Industries, Inc., Tokyo (JP)

(72) Inventors: Kentaro Sano, Masaki (JP); Keisuke Inose, Masaki (JP); Naokichi Imai, Masaki (JP); Atsuki Tsuchiya, Nagoya (JP)

(73) Assignee: Toray Industries, Inc. (JP)

( * ) Notice: Subject to any disclaimer, the term of this patent is extended or adjusted under 35 U.S.C. 154(b) by 167 days.

This patent is subject to a terminal disclaimer.

(21) Appl. No.: 15/032,214

(22) PCT Filed: Oct. 24, 2014

(86) PCT No.: PCT/JP2014/078291
§ 371 (c)(1),
(2) Date: Apr. 26, 2016

(87) PCT Pub. No.: WO2015/064485
PCT Pub. Date: May 7, 2015

(65) Prior Publication Data
US 2016/0272814 A1    Sep. 22, 2016

(30) Foreign Application Priority Data

Oct. 29, 2013 (JP) ................... 2013-224131
Dec. 27, 2013 (JP) ................... 2013-271329
Dec. 27, 2013 (JP) ................... 2013-271330

(51) Int. Cl.
| | |
|---|---|
| C08L 81/04 | (2006.01) |
| C08K 5/29 | (2006.01) |
| C08K 9/04 | (2006.01) |
| C08J 3/22 | (2006.01) |
| C08L 101/00 | (2006.01) |
| C08J 5/06 | (2006.01) |
| C08L 69/00 | (2006.01) |

(52) U.S. Cl.
CPC ............. *C08L 81/04* (2013.01); *C08J 3/22* (2013.01); *C08J 5/06* (2013.01); *C08K 5/29* (2013.01); *C08K 9/04* (2013.01); *C08L 69/00* (2013.01); *C08L 101/00* (2013.01)

(58) Field of Classification Search
CPC ...................... C08K 5/29; C08K 9/04
See application file for complete search history.

(56) References Cited

U.S. PATENT DOCUMENTS

| | | |
|---|---|---|
| 2002/0019182 A1 | 2/2002 | Ishibashi et al. |
| 2007/0155877 A1 | 7/2007 | Shinohara |
| 2010/0093888 A1 | 4/2010 | Endo et al. |
| 2011/0160384 A1 | 6/2011 | Shimazu et al. |
| 2012/0028063 A1 | 2/2012 | Sakata |
| 2012/0083553 A1 | 4/2012 | Wakatsuka et al. |
| 2012/0128281 A1 | 5/2012 | Himeno et al. |
| 2013/0171388 A1 | 7/2013 | Pawlik et al. |
| 2016/0257793 A1* | 9/2016 | Imai .................. C08J 5/042 |
| 2016/0264740 A1* | 9/2016 | Imai .................. C08K 9/04 |

FOREIGN PATENT DOCUMENTS

| | | |
|---|---|---|
| CN | 101733925 | 6/2010 |
| JP | 61-40354 A | 2/1986 |
| JP | 5-86291 A | 4/1993 |
| JP | 9-194720 A | 7/1997 |
| JP | 9-194741 A | 7/1997 |
| JP | 9-227173 A | 9/1997 |
| JP | 9-290482 A | 11/1997 |
| JP | 10-138379 A | 5/1998 |
| JP | 10-251918 A | 9/1998 |
| JP | 2004-91504 A | 3/2004 |
| JP | 2006-143932 A | 6/2006 |
| JP | 2008-231291 A | 10/2008 |
| JP | 2009-517500 A | 4/2009 |
| JP | 2010-111739 A | 5/2010 |
| JP | 2010-270317 A | 12/2010 |
| JP | 2012-57277 A | 3/2012 |
| JP | 2013-49790 A | 3/2013 |
| JP | 2013-139568 A | 7/2013 |
| WO | 2008/102919 A1 | 8/2008 |
| WO | 2010/029869 A1 | 3/2010 |
| WO | 2010/122915 A1 | 10/2010 |
| WO | 2010/140622 A1 | 12/2010 |
| WO | 2011/013737 A1 | 2/2011 |

OTHER PUBLICATIONS

Technical Data Sheet, RheinChemie, 2008, STABAXOL KE 7646 Masterbatch.
Technical Data Sheet, RheinChemie, 2008, STABAXOL KE 9193 Masterbatch.

* cited by examiner

*Primary Examiner* — Vickey Nerangis
(74) *Attorney, Agent, or Firm* — DLA Piper LLP (US)

(57) ABSTRACT

A molding material includes 5 to 50 parts by mass of reinforcing fibers (A) with a sizing agent (s) deposited thereon, 1 to 20 parts by mass of a component (B) containing a polycarbodiimide compound (B-1) that is liquid at 50° C., and 30 to 94 parts by mass of a thermoplastic resin (C) containing an element other than carbon in the repeating unit structure of the main chain, based on 100 parts by mass of the total of the components (A) to (C), wherein the molding material is a composite in which a composite fiber bundle (D) with the component (A) impregnated with the component (B) is covered with the component (C).

12 Claims, 7 Drawing Sheets

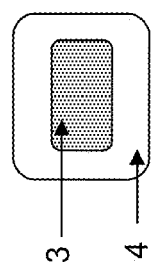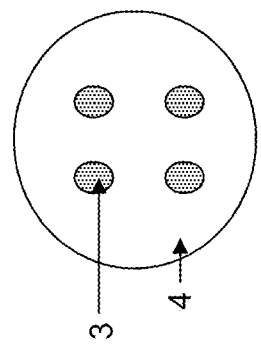

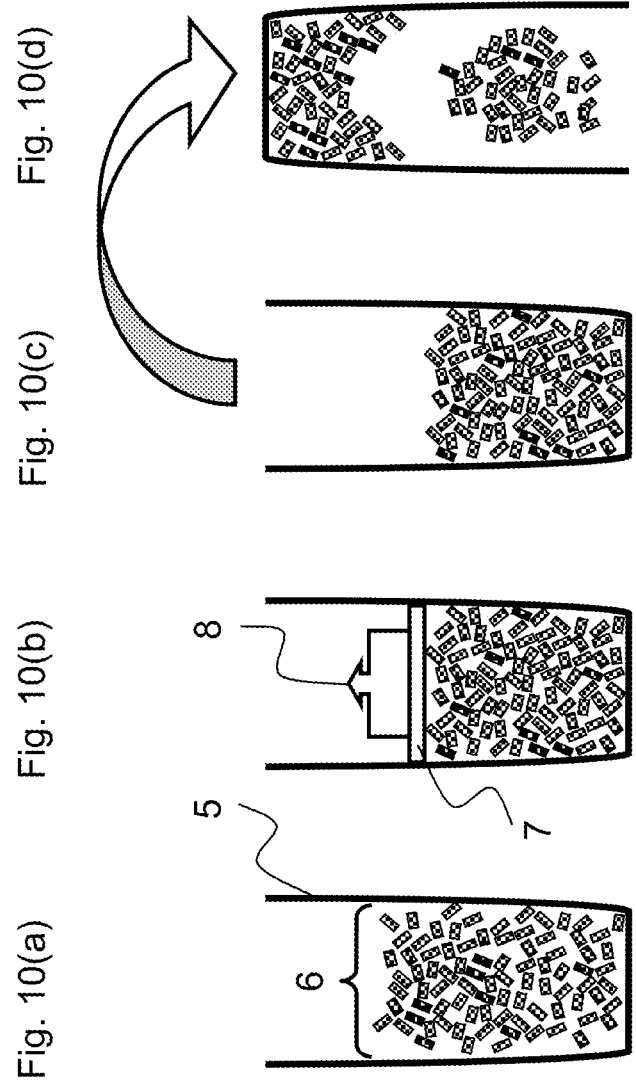

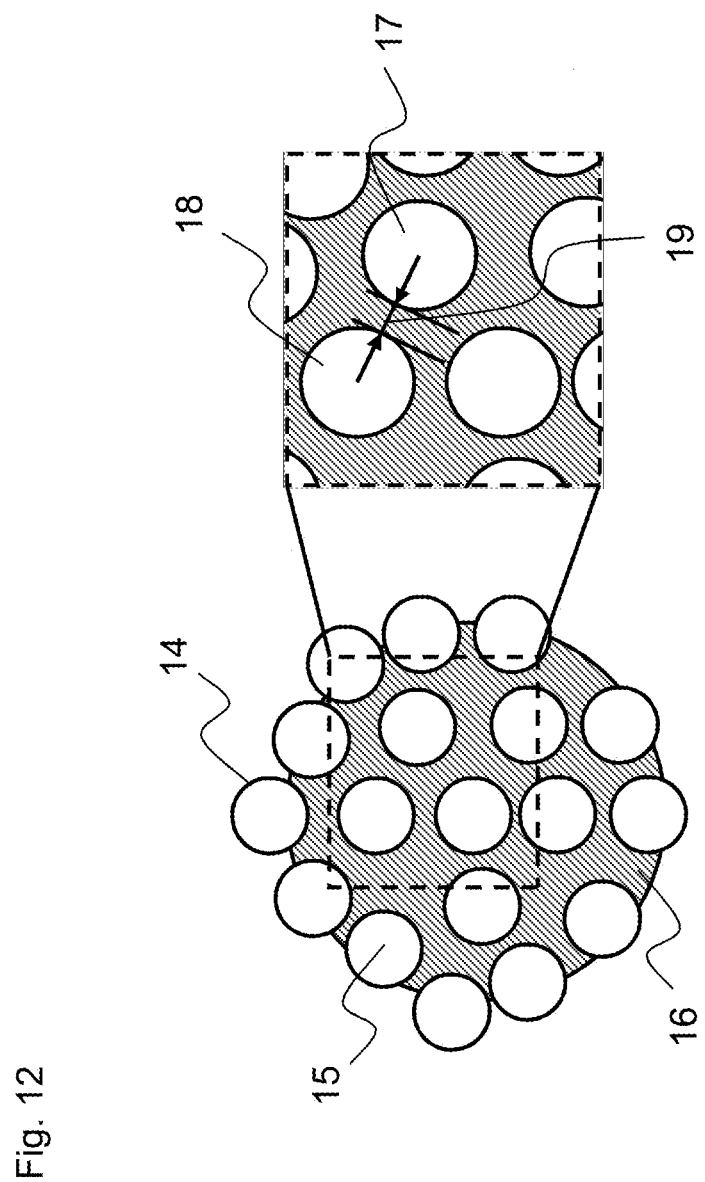

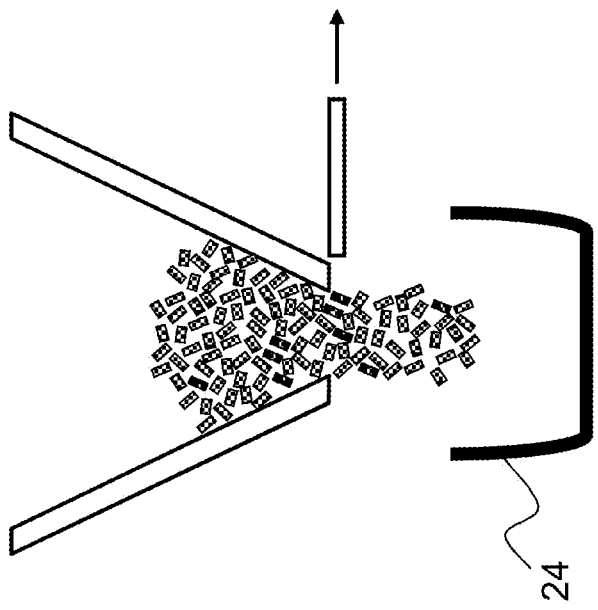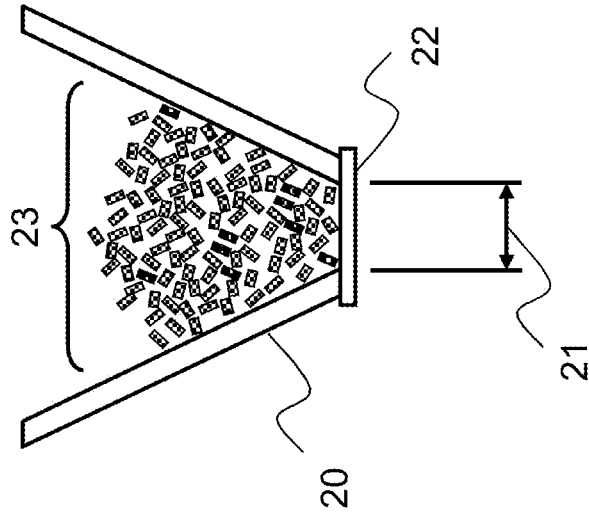

MOLDING MATERIAL, METHOD OF PRODUCING SAME, AND MASTER BATCH USED IN SAME

TECHNICAL FIELD

This disclosure relates to a molding material having a good resin impregnation property to a reinforcing fiber bundle, that is excellent in process stability during production, and can provide a molded article having excellent dynamic characteristics; a method of producing the molding material; a molded article produced using the molding material; and a master batch excellent in handling characteristics in a high-temperature molding process and functional stability during storage.

BACKGROUND

Molding materials composed of reinforcing fibers and a thermoplastic resin are widely used in sports goods applications, aerospace applications and general industrial applications because they are lightweight and have excellent dynamic characteristics. Reinforcing fibers to be used in these molding materials reinforce molding articles in various ways depending on their use application. For those reinforcing fibers, metal fibers such as aluminum fibers and stainless fibers, organic fibers such as aramid fibers and PBO fibers, inorganic fibers such as silicon carbide fibers, and carbon fibers are used. From the viewpoint of a balance of specific strength, specific rigidity and lightness, carbon fibers are suitable, and among them, polyacrylonitrile-based carbon fibers are suitably used.

Further, as molding materials including a continuous reinforcing fiber bundle and a thermoplastic resin as a matrix, a variety of forms such as thermoplastic prepregs, yarns and glass mats (GMT) are known. Those molding materials facilitate molding by taking advantage of the characteristics of a thermoplastic resin, do not require a load for storage unlike a thermosetting resin, provide molded articles having high toughness, and are excellent in recyclability. Particularly, molding materials processed into a pellet shape are applicable to a molding method excellent in economy and productivity such as injection molding or stamping molding, and are thus useful as industrial materials.

However, in fact, such molding materials are not so widely used because impregnation of a continuous reinforcing fiber bundle with a thermoplastic resin in the process of producing a molding material has problems in economy and productivity. For example, it is well known that a resin having a higher melt viscosity is more difficult to impregnate to a reinforcing fiber bundle. A thermoplastic resin excellent in dynamic characteristics such as toughness and elongation is a particularly high-molecular-weight body, thus has a viscosity higher than that of a thermosetting resin, requires a higher process temperature, and is therefore unsuitable to easily produce a molding material with high productivity.

On the other hand, when a thermoplastic resin having a low molecular weight, i.e. a low viscosity is used as a matrix resin for ease of impregnation, there is the problem that the dynamic characteristics of the resulting molded article are considerably deteriorated.

Japanese Patent Laid-open Publication No. 10-138379 discloses a molding material in which a high-molecular-weight thermoplastic resin is disposed in contact with a composite composed of a low-molecular-weight thermoplastic polymer and a continuous reinforcing fiber bundle. In that molding material, a low-molecular-weight body is used for impregnation of a continuous reinforcing fiber bundle, while a high-molecular-weight body is used as a matrix resin so that not only economy and productivity but also dynamic characteristics are secured. When the molding material is molded by an injection molding method, reinforcing fibers are easily mixed with a matrix resin while breakage of the reinforcing fibers is minimized in plasticization of the material during molding, and thus a molded article excellent in dispersibility of fibers can be produced. Therefore, the resulting molded article can include reinforcing fibers having a larger fiber length than before, and have both good dynamic characteristics and excellent external appearance quality.

In recent years, however, fiber-reinforced composite materials have increasingly received attention, and come into use in a variety of segmented applications so that a molding material further excellent in moldability, handling characteristics, and dynamic characteristics of the resulting molded article has been required, and it has become necessary to further improve economy and productivity from an industrial point of view. A wide variety of technical developments have become necessary to, for example, reduce a process load by further improving the impregnation property of a low-molecular-weight body, propose a molding material having further improved heat resistance, improve dynamic characteristics by increasing the fiber length by improving fiber dispersibility during molding, and further improve the surface external appearance.

Japanese Patent Laid-open Publication No. 2008-231291 discloses a molding material in which a high-molecular-weight thermoplastic resin is disposed in contact with a composite composed of a polyarylene sulfide prepolymer and continuous reinforcing fibers. The polyarylene sulfide prepolymer is an excellent material easily impregnated to a reinforcing fiber bundle to improve the productivity of a molding material, and is easily dispersible in or compatible with a matrix resin in a molding step to improve dispersion of reinforcing fibers in a molded article. However, the polyarylene sulfide prepolymer has a high melting temperature of about 200 to 260° C., and requires a high temperature of 200° C. or higher for impregnating reinforcing fibers with the polyarylene sulfide prepolymer. When the impregnation temperature becomes high, i.e. 200° C. or higher, fuzz of reinforcing fibers may easily occur in an impregnation step, leading to deterioration of productivity due to thread breakage caused by fuzz, or necessity of removal of fuzz. One method of improving productivity of the molding material may be the use of a substance that takes the place of a polyarylene sulfide prepolymer and has a low melting temperature.

Japanese Patent Laid-open Publication No. 2012-57277 discloses a molding material with a thermoplastic resin bonded to a reinforcing fiber bundle in which an epoxy resin satisfying specific conditions is heated and melted, and impregnated to the reinforcing fiber bundle. The disclosed epoxy resin has a relatively low melting temperature, and is impregnated to reinforcing fibers at about 150° C., and productivity is improved as compared to the technique in Japanese Patent Laid-open Publication No. 2008-231291. However, the dynamic characteristics of a molded article obtained by molding the molding material are not sufficient, and development of a molding material having both productivity and high dynamic characteristics is desired.

Particularly among matrix resins, resins having high heat resistance, for example, carbonates having a glass transition temperature of 140° C. or higher, and thermoplastic resins classified as super engineering plastics and having extremely high heat resistance are used as alternative materials of metals for the purpose of reducing the body weight in automobile fields, and increasingly used in electric and electronic fields because the use of lead-free solder is increased from an environmental point of view, a higher temperature is necessary for melting solder, and resultantly a resin material to be used is increasingly required to have more strict heat resistance.

While heat-resistant resins have come into wide spread use, a high process temperature is necessary as a matter of course for molding these resins, and thus a molding material having good workability and handling characteristics in such a process has become necessary.

Japanese Patent Laid-open Publication No. 2008-231291 discloses a molding material in which a high-molecular-weight thermoplastic resin is disposed in contact with a composite composed of a polyarylene sulfide prepolymer and continuous reinforcing fibers. The polyarylene sulfide prepolymer is an excellent material easily impregnated to a reinforcing fiber bundle to improve the productivity of a molding material, and is easily dispersible in or compatible with a matrix resin in a molding step to improve dispersion of reinforcing fibers in a molded article. However, there are still problems in interface strength between reinforcing fibers and the matrix resin, and further improvement of dynamic characteristics is desired.

Further, a master batch to be used in these molding materials is a molding material in which additives for imparting functions such as strength, impact resistance, flame retardancy and colorization are blended in a resin beforehand, and the functions can be exhibited by blending only a small amount of the master batch in a matrix resin. Many of additives are in the form of a powder or a fine flake, and therefore often difficult to handle. They are more easily handled when formed into a master batch in use, and therefore the master batch is widely used to modify a resin and impart functions.

Recently, among matrix resins, resins having high heat resistance, for example, carbonates having a glass transition temperature of 140° C. or higher, and thermoplastic resins classified as super engineering plastics and having extremely high heat resistance have been used as alternative materials of metals for the purpose of reducing the body weight in automobile fields, and increasingly used in electric and electronic fields because the use of lead-free solder is increased from an environmental point of view, a higher temperature is necessary for melting solder, and resultantly a resin material to be used is increasingly required to have more strict heat resistance.

While heat-resistant resins have come into wide spread use, a high process temperature is necessary as a matter of course for molding these resins, and thus a master batch having good workability and handling characteristics in such a process has become necessary.

For example, fiber-reinforced thermoplastic resins composed of a thermoplastic resin and reinforcing fibers are excellent in balance between lightness and dynamic characteristics, and are therefore widely used in structural members of aircrafts, automobiles and watercrafts, electric and electronic device cases, sports applications, and industrial materials such as building materials, but because further high heat resistance is required, a master batch capable of modifying a matrix resin, imparting functions thereto, and improving adhesion with reinforcing fibers even at a high temperature is desired.

Japanese Patent Laid-open Publication No. 2013-49790 discloses a master pellet formed by adding to polyester an end-capping agent containing a carbodiimide compound, and melting and kneading the mixture by an extruder. Application of that master pellet as a master batch is considerably limited because the matrix resin varies for a resin other than polyester.

On the other hand, Japanese Patent Laid-open Publication No. 5-86291 and Japanese Patent Laid-open Publication No. 10-251918 each disclose a resin composition and fibers in which a master batch with a carbodiimide compound added to polyphenylene sulfide is used. Those methods do not describe the state of existence of the carbodiimide compound in the master batch, and mere addition of the carbodiimide compound causes the problem that when the master batch is stored in a once unsealed bag, the carbodiimide absorbs water to reduce exhibition of intended functions.

In view of the problems of the conventional techniques, it could be helpful to provide a molding material having a good impregnation property to a reinforcing fiber bundle at 200° C. or lower, and that is capable of achieving high productivity and ensures that a molded article having high dynamic characteristics can be produced. Further, it could be helpful to provide a molding material that ensures that a molded article having high dynamic characteristics can be produced and is excellent in blocking resistance and excellent in handling characteristics. Further, it could be helpful to provide a master batch having improved handling characteristics particularly in a high-temperature molding process at 300° C. or higher, and that is excellent in functional stability during storage.

SUMMARY

We found that by controlling the morphology of a master batch obtained with a specific composition, occurrence of blocking and bridging is suppressed even in a high-temperature molding process, and functional stability during storage is improved, leading to our master batch.

The molding material thus includes:

5 to 50 parts by mass of reinforcing fibers (A) with a sizing agent (s) deposited thereon;

1 to 20 parts by mass of a component (B) containing a polycarbodiimide compound (B-1) that is liquid at 50° C. or a polycarbodiimide compound (B-2) that is solid at 50° C.; and 30 to 94 parts by mass of a thermoplastic resin (C) containing an element other than carbon in a repeating unit structure of a main chain, based on 100 parts by mass of the total of the components (A) to (C), the molding material being a composite in which a composite fiber bundle (D) with the component (A) impregnated with the component (B) is covered with the component (C).

A method of producing the molding material includes the step of: bringing the component (C) into contact with a composite fiber bundle (D) to obtain a composite, the composite fiber bundle (D) being prepared by bringing the component (B) in a molten state at 50 to 300° C. into contact with the component (A), and performing heating to impregnate the component (A) with 80 to 100% by mass of the supply of the component (B).

A method of producing the molding material includes using a master batch including: 40 to 90% by mass of at least one thermoplastic resin selected from the group consisting of polycarbonate, polyester, polyphenylene sulfide, polyamide, polyoxymethylene, polyether imide, polyether sulfone, polyether ketone, polyether ether ketone and polyether ketone ketone as the component (C); and 10 to 60% by mass of a polycarbodiimide compound having two or more carbodiimide groups in one molecule as a component (B'), the master batch satisfying either one of the following requirements (i) and (ii):

(i) a morphology of a sea-island structure in which the component (B') is dispersed in the component (C), and the average particle size of the dispersed particles of the component (B') is 1 to 100 μm; and (ii) a morphology in which the component (B') has a continuous structure, and the average thickness of a continuous phase is 1 to 100 μm.

A master batch includes: 40 to 90% by mass of at least one thermoplastic resin selected from the group consisting of polycarbonate, polyester, polyphenylene sulfide, polyamide, polyoxymethylene, polyether imide, polyether sulfone, polyether ketone, polyether ether ketone and polyether ketone ketone as the component (C); and 10 to 60% by mass of a polycarbodiimide compound having two or more carbodiimide groups in one molecule as the component (B'), the master batch having a morphology of a sea-island structure in which the component (B') is dispersed in the component (C), and the average particle size of the dispersed particles of the component (B') is 1 to 100 μm.

A master batch includes: 40 to 90% by mass of at least one thermoplastic resin selected from the group consisting of polycarbonate, polyester, polyphenylene sulfide, polyamide, polyoxymethylene, polyether imide, polyether sulfone, polyether ketone, polyether ether ketone and polyether ketone ketone as the component (C); and 10 to 60% by mass of a polycarbodiimide compound having two or more carbodiimide groups in one molecule as the component (B'), the master batch having a morphology in which the component (B') has a continuous structure, and the average thickness of a continuous phase is 1 to 100 μm.

The molded article is a molded article formed by molding a resin composition or fiber-reinforced resin composition produced using the above-mentioned molding material, a molding material obtained by the above-mentioned method, or the above-mentioned master batch.

Our molding material has a good impregnation property to a reinforcing fiber bundle even at 200° C. or lower during production so that high productivity can be achieved. The molded article produced by molding the molding material has extremely high dynamic characteristics.

The molding material is excellent in blocking resistance and excellent in handling characteristics. Further, the molded article produced by molding the molding material has extremely high dynamic characteristics.

Our master batch is excellent in handling characteristics in a high-temperature molding process, and is capable of suppressing a reduction in functions due to water absorption/moisture absorption that occurs during storage.

Further, the master batch is capable of increasing the concentration of additives, and ensures a wide adjustment range of the concentration of additives in a resin composition or fiber-reinforced resin composition produced using the master batch.

The molded article molded is extremely useful in various kinds of components and members such as components, internal members and cases for electric and electronic devices, OA equipment, household electrical appliances and automobiles.

BRIEF DESCRIPTION OF THE DRAWINGS

FIG. 8 is a schematic view showing one example of a preferred transverse section form of a molding material.

FIG. 9 is a schematic view showing one example of a preferred transverse section form of a molding material.

FIGS. 10($a$) to 10($d$) are schematic diagrams explaining a method of measuring the blocking resistance of a molding material or a master batch, where FIG. 10($a$) is a schematic diagram showing a state in which a graduated cylinder is charged with a measured molding material or master batch; FIG. 10($b$) is a schematic diagram showing a state in which a plumb is placed to apply a load to the molding material or the master batch; FIG. 10($c$) is a schematic diagram showing a state after the plumb is removed and before the blocking resistance is measured; and FIG. 10($d$) is a schematic diagram showing a state immediately after the graduated cylinder is reversed to start measurement of the blocking resistance.

FIG. 12 is a schematic diagram of a morphology of a master batch according to a second example.

FIGS. 13($a$) and 13($b$) are schematic diagrams explaining a method of measuring the flowing time of a master batch, where FIG. 13($a$) is a schematic diagram showing a state before measurement of the flowing time, and FIG. 13($b$) is a schematic diagram showing a state immediately after the start of measurement of the flowing time.

DESCRIPTION OF REFERENCE SIGNS

Figure 3:
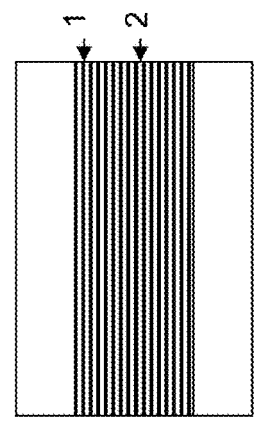
FIG. 3 is a schematic view showing one example of a preferred longitudinal section form of a molding material.

1: Single fiber of reinforcing fibers
2: Component (B)
3: Composite fiber bundle (D)
4: Thermoplastic resin (C)
5: Graduated cylinder
6: Molding material
7: Lid
8: Plumb
9: Master batch
10: Thermoplastic resin (A)
11: Polycarbodiimide compound (B')
12: Inscribed circle
13: Circumscribed circle
14: Master batch
15: Thermoplastic resin (A)
16: Polycarbodiimide compound (B')
17: Randomly selected thermoplastic resin (An)
18: Thermoplastic resin (Am) closest to randomly selected thermoplastic resin (An)
19: Thickness of polycarbodiimide compound (B') continuous phase
20: Funnel
21: Inner diameter of funnel
22: Lid
23: Master batch
24: Container

DETAILED DESCRIPTION

First, our molding material will be described in detail.

The molding material includes 5 to 50 parts by mass of reinforcing fibers (A) with a sizing agent (s) deposited thereon; 1 to 20 parts by mass of a component (B) containing a polycarbodiimide compound (B-1) that is liquid at 50° C. or a polycarbodiimide compound (B-2) that is solid at 50° C.; and 30 to 94 parts by mass of a thermoplastic resin (C) containing an element other than carbon in a repeating unit structure of a main chain, based on 100 parts by mass of the total of the components (A) to (C), the molding material being a composite in which a composite fiber bundle (D) with the component (A) impregnated with the component (B) is covered with the component (C). First, these components will be described.

The composite fiber bundle (D) is one in which the reinforcing fibers (A) are impregnated with the component (B) (hereinafter, also referred to as an impregnated agent).

The reinforcing fibers that constitute the component (A) are not particularly limited and, for example, high-strength and high-modulus fibers such as carbon fibers, glass fibers, aramid fibers, alumina fibers, silicon carbide fibers, boron fibers, metal fibers, PBO fibers and high-strength polyethylene fibers can be used. One type of these fibers may be used, or two or more types of these fibers may be used in combination. Among them, carbon fibers such as PAN-based carbon fibers, pitch-based carbon fibers and rayon-based carbon fibers are preferable from the viewpoint of improvement of dynamic characteristics, and the effect of reducing the weight of a molded article, and PAN-based carbon fibers are further preferable from the viewpoint of a balance between the strength and the elastic modulus of the resulting molded article. For the purpose of imparting conductivity, reinforcing fibers coated with a metal such as nickel, copper or ytterbium can be used.

Further, in carbon fibers, the surface oxygen concentration ratio [O/C] which is a ratio of the number of atoms of oxygen (O) to the number of atoms of carbon (C) on the surfaces of fibers as measured by X-ray photoelectron spectroscopy is preferably 0.05 to 0.5, more preferably 0.08 to 0.4, further preferably 0.1 to 0.3. When the surface oxygen concentration ratio is 0.05 or more, the amount of functional groups on the surfaces of carbon fibers can be secured to achieve stronger bonding to the thermoplastic resin. The upper limit of the surface oxygen concentration ratio is not particularly limited, but for example, it may be generally 0.5 or less from the viewpoint of a balance of handling characteristics of carbon fibers and productivity.

The surface oxygen concentration ratio of carbon fibers is determined by X-ray photoelectron spectroscopy in accordance with the following procedure. First, a carbon fiber bundle, from which a sizing agent or the like deposited on the surfaces of carbon fibers is removed with a solvent, is cut to 20 mm, and spread and arranged on a sample support stand made of copper, and the inside of a sample chamber is then kept at $1 \times 10^8$ Torr while $AlK\alpha_{1,2}$ is used as an X ray source. As a correction value of a peak associated with charging during measurement, the kinetic energy value (K.E.) at the main peak of $C_{1s}$ is matched to 1202 eV. The $C_{1s}$ peak area is determined by drawing a straight base line over 1191 to 1205 eV as the value K.E. The $O_{1s}$ peak area is determined by drawing a straight base line over 947 to 959 eV as the value K.E.

The surface oxygen concentration ratio is calculated as a ratio of the number of atoms from the ratio of the $O_{1s}$ peak area to the $C_{1s}$ peak area using a sensitivity correction value specific to an apparatus. When Model ES-200 manufactured by Kokusai Electric Inc. is used as an X-ray photoelectron spectrometer, the sensitivity correction value is set to 1.74.

The method of controlling the surface oxygen concentration ratio [O/C] to 0.05 to 0.5 is not particularly limited and, for example, methods such as an electrolytic oxidation treatment, a chemical oxidation treatment and a gas phase oxidation treatment may be employed, with the electrolytic oxidation treatment being preferable.

The average fiber diameter of reinforcing fibers is not particularly limited, but it is preferably 1 to 20 μm, more preferably 3 to 15 μm from the viewpoint of the dynamic characteristics and surface external appearance of the resulting molded article.

The number of single fibers of the reinforcing fiber bundle is not particularly limited, and it may be 100 to 350,000, and is preferably 1,000 to 250,000 in particular. A sufficiently impregnated composite fiber bundle can be obtained even from a reinforcing fiber bundle having a large number of single fibers, and thus the number of single fibers is preferably 20,000 to 100,000 from the viewpoint of productivity.

It is necessary that a sizing agent (s) be deposited on the component (A). When the sizing agent (s) is deposited, convergence, bending resistance and abrasion resistance are improved so that in the step of impregnation of the component (B), occurrence of fuzz and thread breakage can be suppressed to improve productivity. Particularly, in carbon fibers, a sizing agent is added so that adhesion and composite total characteristics can be improved in conformity with surface characteristics given by functional groups and the like on the surfaces of carbon fibers.

The deposition amount of the sizing agent is not particularly limited, but it is preferably 0.01 to 10% by mass, more preferably 0.05 to 5% by mass or less, further preferably 0.1 to 2% by mass based on the mass of only reinforcing fibers. When the deposition amount of the sizing agent is less than 0.01% by mass, the adhesion improving effect is hardly exhibited, and when the deposition amount is more than 10% by mass, the impregnation property of the component (B) may be affected to deteriorate the properties of molded articles.

Further, the mass of the sizing agent is preferably 0.001 to 0.5 where the mass of the component (B) is 1. The mass of the sizing agent is more preferably 0.005 to 0.1, further preferably 0.01 to 0.05. It is preferable that the mass of the sizing agent is in the above-mentioned range because interfacial adhesion, fiber dispersibility and mechanical characteristics can be improved in good balance.

The sizing agent (s) is not particularly limited as long as it is capable of suppressing occurrence of fuzz and thread breakage in the step of impregnation of the component (B), but to improve adhesion between reinforcing fibers and the matrix resin, the sizing agent (s) is preferably a compound having two or more functional groups in one molecule, the functional group being at least one selected from the group consisting of a carboxyl group, a hydroxyl group, an amino group and an epoxy group. Two or more of the functional groups may coexist in one molecule, or two or more compounds each having two or more identical functional groups in one molecule may be used in combination. The sizing agent (s) is preferably an aliphatic compound. It is preferable that the sizing agent (s) is an aliphatic compound because its affinity to the component (A) and the component (B) is improved, and therefore a molded article excellent in dynamic characteristics can be obtained.

Specific examples of the sizing agent (s) include polyfunctional epoxy resins, acrylic acid-based polymers, polyhydric alcohols and polyethyleneimine, and in particular, polyfunctional epoxy resins having high reactivity with the surface functional groups of the component (A), and the component (B) are preferable.

Examples of the polyfunctional epoxy resin include tri-or-more functional aliphatic epoxy resins and phenol novolac type epoxy resins. Among them, tri-or-more functional aliphatic epoxy resins are preferable from the viewpoint of affinity to an aliphatic carbodiimide compound. The tri-or-more functional aliphatic epoxy resin means an aliphatic epoxy resin having three or more epoxy groups in one molecule.

Specific examples of the tri-or-more functional aliphatic epoxy resin include polyglycidyl ethers of aliphatic polyhydric alcohols such as glycerol triglycidyl ether, diglycerol polyglycidyl ether, polyglycerol polyglycidyl ether, sorbitol polyglycidyl ether, arabitol polyglycidyl ether, trimethylolpropane triglycidyl ether and pentaerythritol polyglycidyl ether. Among these aliphatic epoxy resins, glycerol triglycidyl ether, diglycerol polyglycidyl ether and polyglycerol polyglycidyl ether are preferably used because they contain a large number of high-reactive epoxy groups in one molecule, and have high solubility in water and are easily applied to reinforcing fibers (A).

The acrylic acid-based polymer is any of polymers which are polymers of acrylic acid, methacrylic acid and maleic acid, and contain three or more carboxyl groups in one molecule. Specific examples include polyacrylic acids, copolymers of acrylic acid and methacrylic acid, copolymers of acrylic acid and maleic acid, and mixtures of two or more thereof. Further, the acrylic acid-base polymer may be one in which the carboxyl group is partially neutralized with an alkali (i.e. formed into a carboxylic acid salt) as long as the number of the functional groups is 3 or more in one molecule. Examples of the alkali include alkali metal hydroxides such as sodium hydroxide, lithium hydroxide and potassium hydroxide, and ammonium hydroxide. As the acrylic acid-based polymer, a polyacrylic acid containing a larger number of carboxyl groups in one molecule is preferably used.

Specific examples of the polyhydric alcohol include polyvinyl alcohol, glycerol, diglycerol, polyglycerol, sorbitol, arabitol, trimethylolpropane and pentaerythritol. Among them, polyvinyl alcohol containing a larger number of hydroxyl groups in one molecule is preferably used.

Examples of the polyethyleneimine include polyamines which are obtained by ring-opening polymerization of ethyleneimine and have a branched structure with primary, secondary and tertiary amino groups and, among them, polyethyleneimine containing a larger number of amino groups in one molecule is preferably used.

A value obtained by dividing the mass average molecular weight of the sizing agent (s) by the number of the functional groups in one molecule (the total number of carboxyl groups, hydroxyl groups, amino groups and epoxy groups) is preferably 40 to 150. When the above-mentioned value is in such a range, the density of reaction points between the surface functional groups of the reinforcing fibers (A) and the functional groups of the component (B) can be made more uniform so that dynamic characteristics, such as flexural strength, of the resulting fiber-reinforced composite material can be further improved.

The method of adding the sizing agent (s) is not particularly limited, and examples thereof include a method in which the fibers are immersed in a sizing liquid via a roller, a method in which the fibers are brought into contact with a roller with a sizing liquid deposited thereon, and a method in which a sizing liquid is atomized and sprayed to the fibers. Either a batch process or a continuous process may be employed, but the continuous process is preferable in that variations can be reduced with good productivity. It is preferable to control the concentration of the sizing liquid, the temperature and the thread strip tension so that effective components of the sizing agent are uniformly deposited on reinforcing fibers while the deposition amount thereof falls within a proper range. It is more preferable to ultrasonically vibrate reinforcing fibers during addition of the sizing agent.

The drying temperature and time should be adjusted depending on the deposition amount of the compound, but the drying temperature is preferably 150° C. or higher and 350° C. or lower, more preferably 180° C. or higher and 250° C. or lower for reducing the time required for complete removal and evaporation of a solvent used for addition of the sizing agent, while preventing thermal degradation of the sizing agent, and preventing a situation in which reinforcing fibers (A) with the sizing agent deposited thereon are hardened to deteriorate the spreadability of the bundle.

Examples of the solvent to be used for addition of the sizing agent include water, methanol, ethanol, dimethylformamide, dimethylacetamide and acetone, and water is preferable from the viewpoint of ease of handling and disaster prevention. Therefore, when a compound insoluble or hardly soluble in water is used as the sizing agent, it is practical to add an emulsifier or a surfactant to disperse the compound in water. Specific examples of the emulsifier or surfactant that can be used include anionic emulsifiers such as styrene-maleic anhydride copolymers, olefin-maleic anhydride copolymers, formalin condensation products of naphthalenesulfonic acid salts and sodium polyacrylate, cationic emulsifiers such as polyethyleneimine and polyvinyl imidazoline, and nonionic emulsifiers such as nonylphenol ethylene oxide adducts, polyvinyl alcohol, polyoxyethylene ether ester copolymers and sorbitan ester ethyl oxide adducts, and nonionic emulsifiers that are less interactive are preferable because they hardly hinder the adhesive effect of a polyfunctional compound.

The content of the component (A) should be 5 to 50 parts by mass based on 100 parts by mass of the total of the components (A) to (C). The content of the component (A) is preferably 10 to 40 parts by mass, more preferably 13 to 33 parts by mass. It is preferable that the content of the component (A) is in the above-mentioned range because a molded article obtained by molding-processing the molding material has high dynamic characteristics, and fluidity in molding processing is sufficient.

The component (B) contains a polycarbodiimide compound (B-1) that is liquid at 50° C. or a polycarbodiimide compound (B-2) that is solid at 50° C.

The term "liquid at 50° C." means a state in which the compound has sufficient fluidity at 50° C., and the term "solid at 50° C." means a state in which the compound does not have fluidity at 50° C.

The melt viscosity serves as an index to determine whether or not the compound has fluidity. The melt viscosity at 50° C. is measured at 0.5 Hz by 40 mm parallel plates using a viscoelasticity measurement device, and when the viscosity measured in this manner is 10000 Pa·s or less, it is determined that the compound has sufficient fluidity, and is liquid at 50° C. and, on the other hand, when the viscosity is more than 10000 Pa·s, it is determined that the compound does not have fluidity, and is solid at 50° C.

For the compound to be liquid at 50° C., its melting point or softening point should be lower than 50° C., and a compound having a melting point or softening point of 50°

C. or higher may be one that is not liquid at 50° C. For the compound to be solid at 50° C., its melting point or softening point is preferably higher than 50° C.

Examples of the polycarbodiimide compound (B-1) or (B-2) include aliphatic polycarbodiimides and aromatic polycarbodiimides.

The aliphatic polycarbodiimide is a homopolymer or a copolymer having as a main constituent unit a repeating unit represented by formula —N=C=N—$R_1$— (wherein $R_1$ represents a divalent organic group of a cycloaliphatic compound such as cyclohexylene, a divalent organic group of an aliphatic compound such as methylene, ethylene, propylene or methylethylene, or a divalent organic group in which the carbon atom bonded to a nitrogen atom has no unsaturated bond, such as xylylene), and containing preferably 70 mol % or more, more preferably 90 mol % or more, further preferably 95 mol % or more of the repeating unit.

The aromatic polycarbodiimide is a homopolymer or a copolymer having as a main constituent unit a repeating unit represented by formula —N=C=N—$R_2$— (wherein $R_2$ represents a divalent organic group of a cyclic unsaturated compound such as benzene, toluene, xylene, biphenyl, naphthalene or anthracene), and containing preferably 70 mol % or more, more preferably 90 mol % or more, further preferably 95 mol % or more of the repeating unit.

The aliphatic polycarbodiimide and the aromatic polycarbodiimide are similar in structure, but significantly different in reactivity of the carbodiimide group represented by formula —N=C=N—. Generally, it is known that the aromatic polycarbodiimide has a resonance stabilization effect, and is therefore inferior in reactivity to the aliphatic polycarbodiimide although it cannot be said that the same applies universally when considering the effect of steric hindrance by a substituent on the periphery of the carbodiimide group. An aliphatic polycarbodiimide is preferably used as the polycarbodiimide compound (B-1) or (B-2) from the viewpoint of reactivity with the thermoplastic resin (C).

On the other hand, an aromatic polycarbodiimide is preferably used as the polycarbodiimide compound (B-1) or (B-2) from the viewpoint of the melt stability of the component (B). Of course, an aliphatic polycarbodiimide and an aromatic polycarbodiimide may be mixed and used. In this case, the mixing ratio can be appropriately selected in consideration of a balance between the reactivity with the thermoplastic resin (C) and the melt stability of the component (B).

The component (B) should contain the polycarbodiimide compound (B-1) that is liquid at 50° C. or the polycarbodiimide compound (B-2) that is solid at 50° C.

When the component (B) contains the polycarbodiimide compound (B-1) that is liquid at 50° C., the melt viscosity of the component (B) can be made relatively low, and in the step of impregnating the reinforcing fibers (A) with the component (B), impregnation can be performed at a relatively low temperature so that there is the advantage that the molding material is excellent in productivity, and the dynamic characteristics of a molded article obtained by molding the molding material can be improved.

When the component (B) contains the polycarbodiimide compound (B-2) that is solid at 50° C., there is the advantage that the blocking resistance of the molding material can be improved, and the handling characteristics of the molding material can be improved.

When a monocarbodiimide compound having only one carbodiimide group in the molecule, for example, N,N'-dicyclohexylcarbodiimide is used in place of the polycarbodiimide compound, it may be unable to obtain a molding material having both high dynamic characteristics and high productivity.

The method of synthesizing a polycarbodiimide compound is not particularly limited, and a polycarbodiimide compound can be synthesized by, for example, reacting an organic polyisocyanate in the presence of a catalyst that accelerates the carbodiimidization reaction of an isocyanate group (hereinafter, also referred to as a "carbodiimidization catalyst").

An organic diisocyanate is preferable as the organic polyisocyanate to be used for synthesis of the polycarbodiimide compound. Examples of the organic diisocyanate may include cyclobutylene-1,3-diisocyanate, cyclopentylene-1,3-diisocyanate, cyclohexylene-1,3-diisocyanate, cyclohexylene-1,4-diisocyanate, 1-methylcyclohexylene-2,4-diisocyanate, 1-methylcyclohexylene-2,6-diisocyanate, 1-isocyanate-3,3,5-trimethyl-5-isocyanate methylcyclohexane, cyclohexane-1,3-bis(methylisocyanate), cyclohexane-1,4-bis(methylisocyanate), dicyclohexylmethane-2,4'-diisocyanate, dicyclohexylmethane-4,4'-diisocyanate, ethylene diisocyanate, tetramethylene-1,4-diisocyanate, hexamethylene-1,6-diisocyanate, dodecamethylene-1,12-diisocyanate, lysine diisocyanate methyl esters, and prepolymers with an isocyanate on both ends, which are obtained by reaction of a stoichiometrically excessive amount of any of the above-mentioned diisocyanates with a difunctional active hydrogen-containing compound. These organic diisocyanates may be used alone, or may be used in combination of two or more thereof.

Examples of other organic polyisocyanates that may be used together with the organic diisocyanate may include tri-or-more functional organic polyisocyanates such as cyclohexane-1,3,5-triisocyanate, cyclohexane-1,3,5-tris (methylisocyanate), 3,5-dimethylcyclohexane-1,3,5-tris (methylisocyanate), 1,3,5-trimethylcyclohexane-1,3,5-tris (methylisocyanate), dicyclohexylmethane-2,4,2'-triisocyanate and dicyclohexylmethane-2,4',4'-triisocyanate, and prepolymers with an isocyanate on an end, which are obtained by reaction of a stoichiometrically excessive amount of any of the above-mentioned tri-or-more functional organic polyisocyanates with a di-or-more functional polyfunctional active hydrogen-containing compound.

The other organic polyisocyanates may be used alone, or may be used in combination of two or more thereof, and the use amount thereof is preferably 0 to 40 parts by mass, more preferably 0 to 20 parts by mass based on 100 parts by mass of the organic diisocyanate.

Further, in synthesis of a polycarbodiimide compound, the molecular weight of the resulting aliphatic carbodiimide compound can be appropriately controlled by adding an organic monoisocyanate as necessary.

Examples of the organic monoisocyanate may include alkyl monoisocyanates such as methyl isocyanate, ethyl isocyanate, n-propyl isocyanate, n-butyl isocyanate, lauryl isocyanate and stearyl isocyanate, and cycloalkyl monoisocyanates such as cyclohexyl isocyanate, 4-methylcyclohexyl isocyanate and 2,5-dimethylcyclohexyl isocyanate.

These organic monoisocyanates may be used alone, or may be used in combination of two or more thereof, and the use amount thereof varies depending on a desired molecular weight of the polycarbodiimide compound, but is preferably 0 to 40 parts by mass, more preferably 0 to 20 parts by mass based on 100 parts by mass of the organic polyisocyanate component.

Examples of the carbodiimidization catalyst may include phospholene compounds such as 1-phenyl-2-phospholene- 1-oxide, 1-phenyl-3-methyl-2-phospholene-1-oxide, 1-phenyl-2-phospholene-1-sulfide, 1-phenyl-3-methyl-2-phospholene-1-sulfide, 1-ethyl-2-phospholene-1-oxide, 1-ethyl-3-methyl-2-phospholene-1-oxide, 1-ethyl-2-phospholene-1-sulfide, 1-ethyl-3-methyl-2-phospholene-1-sulfide, 1-methyl-2-phospholene-1-oxide, 1-methyl-3-methyl-2-phospholene-1-oxide, 1-methyl-2-phospholene-1-sulfide, 1-methyl-3-methyl-2-phospholene-1-sulfide, and 3-phospholene isomers thereof, metal carbonyl complexes such as pentacarbonyliron, nonacarbonyldiiron, tetracarbonylnickel, hexacarbonyltungsten and hexacarbonylchromium, acetylacetone complexes of metals such as beryllium, aluminum, zirconium, chromium and iron, and phosphoric acid esters such as trimethyl phosphate, triethyl phosphate, triisopropyl phosphate, tri-t-butyl phosphate and triphenyl phosphate.

The carbodiimidization catalysts may be used alone, or may be used in combination of two or more thereof. The use amount of the catalyst is preferably 0.001 to 30 parts by mass, more preferably 0.01 to 10 parts by mass based on 100 parts by mass of the organic polyisocyanate component.

The temperature in the synthesis reaction of the polycarbodiimide compound is appropriately selected depending on the types of organic polyisocyanate, organic monoisocyanate and carbodiimidization catalyst, but it is normally 20 to 200° C. In the synthesis reaction of the polycarbodiimide compound, the total amount of organic polyisocyanate and organic monoisocyanate components may be added before the reaction, or a part or all thereof may be added continuously or stepwise during the reaction.

A compound capable of reacting with an isocyanate group is added in an appropriate reaction step between the initial stage and the late stage of the synthesis reaction of the polycarbodiimide compound to cap the terminal isocyanate group of the polycarbodiimide compound so that the molecular weight of the resulting aliphatic carbodiimide compound can be adjusted, or a compound capable of reacting with an isocyanate group is added in the late stage of the synthesis reaction of the aliphatic carbodiimide compound so that the molecular weight of the resulting polycarbodiimide compound can be regulated to a predetermined value. Examples of the compound capable of reacting with an isocyanate group may include alcohols such as methanol, ethanol, isopropanol, cyclohexanol and polyethylene glycol, and amines such as dimethylamine, diethylamine and benzylamine.

Examples of the polycarbodiimide compound (B-1) that is liquid at 50° C. include "CARBODILITE (registered trademark)" V-02B, V-04B and V-05 and "ELASTOSTAB (registered trademark)" H01 each manufactured by Nisshinbo Chemical Inc.

Examples of the polycarbodiimide compound (B-1) that is liquid at 50° C. and contains water include "CARBODILITE (registered trademark)" V-02, V-04, V-06, V-02-L2, E-01, E-02, E-03, E-04 and E-05 each manufactured by Nisshinbo Chemical Inc.

When the component (B) contains water, water vapor may be generated in the impregnation step or the coating step to deteriorate productivity and, therefore, it is preferable that the polycarbodiimide compound (B-1) does not contain water. It is desirable that the polycarbodiimide compound (B-1) be used after being dehydrated when it contains water, or it is desirable to use one that does not contain water.

For the polycarbodiimide compound (B-2) that is solid at 50° C., examples of the aromatic polycarbodiimide include "STABAXOL (registered trademark)" P manufactured by Rhein Chemie Company and "STABAXOL (registered trademark)" P400 manufactured by Rhein Chemie Company, and examples of the aliphatic polycarbodiimide include "CARBODILITE (registered trademark)" HMV-15CA, HMV-8CA, LA-1 and 10M-SP each manufactured by Nisshinbo Chemical Inc.

The melt viscosity of the component (B) at 150° C. is preferably 0.001 to 10 Pa·s, more preferably 0.01 to 8 Pa·s, further preferably 0.1 to 5 Pa·s. When the melt viscosity of the component (B) at 150° C. is less than 0.001 Pa·s, the mechanical characteristics of the molded article may be impaired because the mechanical strength of the component (B) is low, and when the melt viscosity of the component (B) at 150° C. is more than 10 Pa·s, it may be unable to achieve high productivity because the viscosity of the component (B) is high.

The viscosity change rate of the component (B) after heating at 150° C. for 2 hours is preferably 1.5 or less, more preferably 1.3 or less. When the viscosity change rate of the component (B) after heating at 150° C. for 2 hours is more than 2, it may be unable to secure production stability, leading to occurrence of deposition unevenness. When the viscosity change rate is 2 or less, stable production can be secured.

The viscosity change rate after heating at 150° C. for 2 hours is determined from the following formula.

viscosity change rate=melt viscosity at 150° C. after heating at 150° C. for 2 hours/melt viscosity at 150° C. before heating at 150° C. for 2 hours The component (B) may contain additives in addition to the polycarbodiimide compound (B-1) that is liquid at 50° C. or the polycarbodiimide compound (B-2) that is solid at 50° C. as long as the desired effect is not impaired. Examples of the additives include thermosetting resins, thermoplastic resins, inorganic filling materials, flame retardants, conductivity imparting agents, crystal nucleating agents, ultraviolet absorbents, antioxidants, vibration controlling agents, antibacterial agents, insect repellents, deodorants, coloration preventing agents, heat stabilizers, mold release agents, antistatic agents, plasticizers, lubricants, colorants, pigments, dyes, foaming agents, foam inhibitors, viscosity modifiers and coupling agents.

Particularly, to adjust the melt viscosity, it is preferable to add a viscosity modifier in the step of impregnating the reinforcing fibers (A) with the component (B).

The viscosity modifier is not particularly limited, but an epoxy resin which is well compatible with the polycarbodiimide compound (B-1) that is liquid at 50° C. or the polycarbodiimide compound (B-2) that is solid at 50° C., and has relatively low reactivity at 150° C. is suitably used.

The epoxy resin is a compound having a glycidyl group. The epoxy resin is one that contains substantially no curing agent, and is not cured through so called three-dimensional crosslinking even when heated.

Examples of the compound having a glycidyl group include glycidyl ether type epoxy resins, glycidyl ester type epoxy resins, glycidyl amine type epoxy resins and cycloaliphatic epoxy resins.

Examples of the glycidyl ether type epoxy resin include bisphenol A type epoxy resins, bisphenol F type epoxy resins, bisphenol AD type epoxy resins, halogenated bisphenol A type epoxy resins, bisphenol S type epoxy resins, resorcinol type epoxy resins, hydrogenated bisphenol A type epoxy resins, aliphatic epoxy resins, phenol novolac type epoxy resins, cresol novolac type epoxy resins, naphthalene type epoxy resins, biphenyl type epoxy resins, biphenyl aralkyl type epoxy resins and dicyclopentadiene type epoxy resins.

Examples of the glycidyl ester type epoxy resin include hexahydrophthalic acid glycidyl esters and dimer acid glycidyl ethers.

Examples of the glycidyl amine type epoxy resin include triglycidyl isocyanurate, tetraglycidyl diaminodiphenylmethane, tetraglycidyl meta-xylenediamine and aminophenol type epoxy resins.

Examples of the cycloaliphatic epoxy resin include 3,4-epoxy-6-methylcyclohexylmethyl carboxylate and 3,4-epoxycyclohexylmethyl carboxylate.

When the component (B) contains additives in addition to the polycarbodiimide compound (B-1) that is liquid at 50° C. or the polycarbodiimide compound (B-2) that is solid at 50° C., the component (B-1) or the component (B-2) in the component (B) is preferably 20 to 100% by mass, more preferably 30 to 100% by mass, further preferably 50 to 100% by mass. It is preferable that the content of the component (B-1) or (B-2) is 20% by mass or more because a molded article having high dynamic characteristics is obtained.

The content of the component (B) should be 1 to 20 parts by mass based on 100 parts by mass of the total of the components (A) to (C). The content of the component (B) is preferably 2 to 15 parts by mass, more preferably 4 to 12 parts by mass. It is preferable that the content of the component (B) is in the above-mentioned range because the component (A) has good fluidity in molding processing, and a molded article having high dynamic characteristics is obtained.

It is preferable that the ratio of the component (A) to the component (B) (component (A)/component (B)) is in the range of 5/1 to 3/1 (mass ratio) because fiber dispersibility can be efficiently improved, and a molded article having high dynamic characteristics is obtained.

The thermoplastic resin (C) should contain an element other than carbon in the repeating unit structure of the main chain for improving the polarity to increase affinity to the reinforcing fibers (A) and the component (B), and more specifically, the thermoplastic resin (C) is preferably at least one thermoplastic resin selected from the group consisting of polycarbonate, polyester, polyarylene sulfide, polyamide, polyoxymethylene, polyether imide, polyether sulfone, polyether ketone, polyether ether ketone and polyether ketone ketone. Preferably, the thermoplastic resin (C) has in the molecule at least one functional group selected from the group consisting of a carboxyl group, a hydroxyl group and an amino group from the viewpoint of adhesion with the reinforcing fibers (A) and the component (B).

The mass average molecular weight of the thermoplastic resin (C) is preferably 10,000 to 80,000, more preferably 10,000 to 60,000, further preferably 10,000 to 40,000. It is preferable that the thermoplastic resin (C) has a small mass average molecular weight because it has a low melt viscosity so that a fiber-reinforced composite material excellent in molding processability is obtained.

For the molding material, the dynamic characteristics such as bending strength of the resulting fiber-reinforced composite material tend to be improved as the mass average molecular weight of the thermoplastic resin (C) decreases. The reason for this may be that in the molding step of the molding material, functional groups in the thermoplastic resin (C) react with functional groups in the polycarbodiimide compound (B-1) or the component (B-2), and the thermoplastic resin (C) having a smaller mass average molecular weight has a relatively larger number of functional groups at the end, leading to an increase in the number of reaction points with the polycarbodiimide compound (B-1) or the component (B-2). For this reason, it is particularly preferable that the mass average molecular weight of the thermoplastic resin (C) is 10,000 to 40,000 in the molding material because the dynamic characteristics of a resulting fiber-reinforced composite material can be achieved at a high level while molding processability can be secured.

The mass average molecular weight of the thermoplastic resin (C) can be measured by size exclusion chromatography (SEC). In SEC, the mass average molecular weight of the thermoplastic resin (C) can be determined by calculating a polystyrene-equivalent mass average molecular weight.

The content of the component (C) should be 30 to 94 parts by mass based on 100 parts by mass of the total of the components (A) to (C). The content of the component (C) is preferably 45 to 88 parts by mass, more preferably 55 to 83 parts by mass. When the content of the component (C) is in the above-mentioned range, a molded article excellent in dynamic characteristics can be obtained.

The molding material should be a composite in which the composite fiber bundle (D) with the component (A) impregnated with the component (B) is coated with the component (C).

The process of producing the composite fiber bundle (D) includes the steps of: (I) supplying the component (B) to the component (A) and bringing the component (B) in a molten state at 50 to 300° C. into contact with the component (A), and (II) heating the component (A), which is in contact with the component (B), to impregnate the component (A) with 80 to 100% by mass of the supply of the component (B). By including the process of producing the composite fiber bundle (D), the molding material can be efficiently produced.

For the step (I), a known production method can be used, and particularly, dipping or coating is preferable. For specific coating, a reverse roll, a positive rotation roll, a kiss roll, a spray or a curtain is preferably used.

Dipping is a method in which the component (B) is supplied to a melting bath by a pump, and the component (A) is caused to pass therethrough in the melting bath. By immersing the component (A) in the melting bath of the component (B), the component (B) can be reliably deposited on the component (A). The reverse roll, positive rotation roll or kiss roll method is a method in which the melted component (B) is supplied by a pump to a roll to apply the melted component (B) to the component (A). Further, the reverse roll method is a method in which two rolls are rotated in mutually opposite directions, and the melted component (B) is applied onto the rolls, and the positive rotation roll method is a method in which two rolls are rotated in the same direction, and the melted component (B) is applied onto the rolls. Usually, in the reverse roll or positive rotation roll method, a method is used in which rolls are further installed with the component (A) sandwiched therebetween to reliably deposit the component (B). On the other hand, the kiss roll method is a method in which the component (A) and a roll merely come into contact with each other to deposit the component (B). Accordingly, the kiss roll is preferably used when the viscosity is relatively low, but in any of the roll methods, a predetermined amount of the heated and melted component (B) is applied to a roll, and the component (A) is made to run while being in contact with the roll so that a predetermined amount of the component (B) can be deposited per unit length of a fiber bundle. The spray method is a method in which by making use of the principle of an atomizer, the melted component (B) is atomized and sprayed to the component (A), and the curtain method is a method in which the melted component (B) is naturally dropped through a small hole, and applied, or made to overflow from a melting bath, and applied. Since the amount required for application is easily controlled, the loss of the component (B) can be reduced.

When the component (B) contains the polycarbodiimide compound (B-1) that is liquid at 50° C., the melting temperature in supply of the component (B) is preferably 50 to 150° C. When the melting temperature is lower than 50° C., the viscosity of the component (B) may increase to cause deposition unevenness in supply of the component (B). When the melting temperature is higher than 150° C., fuzz of reinforcing fibers may easily occur in the step (II), leading to deterioration of productivity due to thread breakage caused by fuzz, or necessity of removal of fuzz. When the component (B) contains the polycarbodiimide compound (B-2) that is solid at 50° C., the melting temperature in supply of the component (B) is preferably 100 to 300° C. When the melting temperature is lower than 100° C., the viscosity of the component (B) may increase to cause deposition unevenness in supply of the component (B). When the melting temperature is higher than 300° C., the component (B) may be thermally decomposed when production is performed over a long period of time.

Then, as the step (II), the component (A) obtained in the step (I) and is in contact with the component (B) is heated to impregnate the component (A) with 80 to 100% by mass of the supply of the component (B). Specifically, the step (II) is a step of impregnating the component (A) up to the inside with the component (B) by an operation in which the component (A) that is in contact with the component (B) is tensioned with a roll or a bar, repeatedly widened and converged, or pressurized and vibrated at a temperature at which the component (B) is melted. More specific examples may include a method in which a fiber bundle is caused to pass to be in contact with the surfaces of a plurality of heated rolls or bars, and thereby widened, and particularly a method is suitably used in which a fiber bundle is impregnated using a squeezing mouthpiece, a squeezing roll, a roll press or a double belt press. The squeezing mouthpiece is a mouthpiece, the mouthpiece diameter of which decreases in the traveling direction. The squeezing mouthpiece scrapes off the excessively deposited component (B) and simultaneously accelerates impregnation while conversing a reinforcing fiber bundle. The squeezing roll is a roller which tensions a reinforcing fiber bundle with a roller to scrape off the excessively deposited component (B) and simultaneously accelerate impregnation. The roll press is an apparatus which continuously removes air in a reinforcing fiber bundle under pressure between two rolls, and simultaneously accelerates impregnation, and the double belt press is an apparatus which vertically presses a reinforcing fiber bundle via a belt to accelerate impregnation.

Preferably, the component (A) is impregnated with 80 to 100% by mass of the supply of the component (B) in the step (II). This ratio is preferably higher from the viewpoint of economy and productivity because it directly influences the yield. This ratio is more preferably 85 to 100% by mass, further preferably 90 to 100% by mass. When this ratio is less than 80% by mass, not only economy is deteriorated, but also the component (B) may generate a volatile component in the step (II) so that voids may remain in the component (A).

When in the step (II), the component (B) contains the polycarbodiimide compound (B-1) that is liquid at 50° C., the maximum temperature of the component (B) is preferably 50 to 200° C., more preferably 50 to 150° C. When the maximum temperature of the component (B) is lower than 50° C., the component (B) cannot be sufficiently melted, and thus a reinforcing fiber bundle which is not sufficiently impregnated may be obtained, and when the maximum temperature of the component (B) is higher than 200° C., fuzz of reinforcing fibers may easily occur, leading to deterioration of productivity due to thread breakage caused by fuzz, or necessity of removal of fuzz. When the component (B) contains the polycarbodiimide compound (B-2) that is solid at 50° C., the maximum temperature of the component (B) is preferably 150 to 400° C. The maximum temperature of the component (B) is preferably 150 to 350° C., more preferably 150 to 300° C. When the maximum temperature of the component (B) is lower than 150° C., the component (B) cannot be sufficiently melted, and thus a reinforcing fiber bundle which is not sufficiently impregnated may be obtained, and when the maximum temperature of the component (B) is higher than 400° C., an undesired sub-reaction may occur such as a crosslinking reaction or decomposition reaction of the component (B).

The heating method in the step (II) is not particularly limited, and specific examples thereof may include a method in which a heated chamber is used, and a method in which heating and pressurization are performed at the same time using a hot roller.

It is preferable to perform heating under a non-oxidizing atmosphere to suppress an undesired sub-reaction such as a crosslinking reaction or thermal decomposition reaction of the component (B). The non-oxidizing atmosphere refers to an atmosphere in which the oxygen concentration is 5% by volume or less, preferably 2% by volume or less, further preferably zero, i.e., an inert gas atmosphere of nitrogen, helium, argon or the like and, among them, a nitrogen atmosphere is preferable from the viewpoint of economy and ease of handling in particular.

The take-over speed of the composite fiber bundle (D) is preferably high from the viewpoint of economy and productivity because it directly influences the process speed. Specifically, the take-over speed is preferably 10 to 100 m/minute. The take-over speed is more preferably 20 to 100 m/minute, further preferably 30 to 100 m/minute. Examples of the take-over method include a method in which the composite fiber bundle (D) is drawn by a nip roller, a method in which the composite fiber bundle (D) is wound by a drum winder, and a method in which the composite fiber bundle (D) is directly taken over while being cut to a constant length by a strand cutter or the like.

Figure 1:
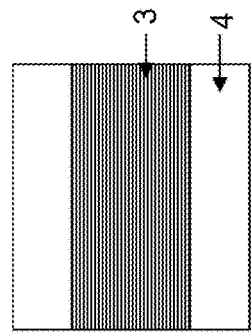
FIG. 1 is a schematic view showing one example of a transverse section form of a composite fiber bundle.

FIG. 1 is a schematic view showing one example of a transverse section form of the composite fiber bundle (D). In FIG. 1, symbol 1 denotes a black part, and symbol 2 denotes a white part. The transverse section means a cross section in a plane crossing orthogonally to the axial center direction. The composite fiber bundle (D) obtained from the steps (I) and (II) is formed by coating and impregnating the component (A) with the component (B). The form of the composite fiber bundle (D) is one as shown in FIG. 1, with the composite (B) filled between the single fibers of the component (A). That is, the single fibers of the component (A) are dispersed like islands in the sea of the component (B).

The composite fiber bundle (D) with the component (A) satisfactorily impregnated with the component (B) serves as a so-called impregnation aid/dispersion aid such that for example, when the composite fiber bundle (D) is injection-molded together with the thermoplastic resin (C), it helps diffusion of the component (B) into the component (C) and dispersion of the component (A) in the component (C), and simultaneously helps substitution and impregnation of the component (A) with the component (C), each component being melted and kneaded in a cylinder of an injection molding machine.

In the composite fiber bundle (D), it is desirable that the component (A) be completely impregnated with the component (B), but this is difficult in practice, and in the composite fiber bundle (D), a certain amount of voids exist (areas where either the component (A) or the component (B) does not exists). The amount of voids increases particularly when the content of the component (A) is high, but the effect of accelerating impregnation/fiber dispersion is exhibited even when a certain amount of voids exists. However, since the effect of accelerating impregnation/fiber dispersion is significantly reduced when the void content exceeds 40%, the void content is preferably less than 40%. The void content is more preferably 20% or less. The void content can be determined by measuring the composite fiber bundle (D) using the test method in ASTM D2734 (1997), or calculated using the following formula from the total area of composite portions formed by the component (A) and the component (B) and the total area of void portions at the transverse section of the composite fiber bundle (D) or composite.

$$\text{void content (\%)} = \text{total area of void portions}/(\text{total area of composite portions} + \text{total area of void portions}) \times 100$$

The molding material is formed as a composite in which the composite fiber bundle (D) obtained in the manner described above is coated with the component (C). The molding material means a raw material to be used in formation of a molded article by injection molding.

The method of coating the composite fiber bundle (D) with the component (C) is not particularly limited, and specific examples thereof may include a method in which the periphery of the composite fiber bundle (D) is continuously coated with the component (C) using an extruder and a coating die for wire coating, and a method in which using an extruder and a T-die, the melted film-shaped component (C) is disposed on both surfaces of the composite fiber bundle (D) flattened by a roll or the like, and is integrated with the composite fiber bundle (D) using a roll or the like.

Figure 2:
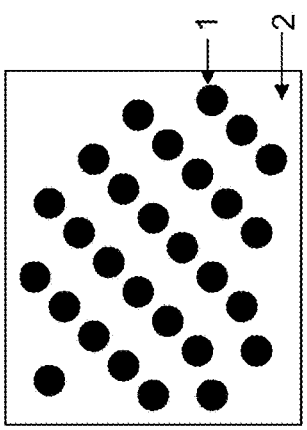
FIG. 2 is a schematic view showing one example of a preferred longitudinal section form of a molding material.

FIG. 2 is a schematic view showing one example of a preferred longitudinal section form of a molding material. In FIG. 2, symbol 1 denotes a black part, and symbol 2 denotes a white part. The longitudinal section means a cross section in a plane including the axial center direction. In one example of the molding material, the component (A) is arranged almost parallel to the axial center direction of the molding material, and the length of the component (A) is substantially the same as the length of the molding material as shown in FIG. 2.

The term "arranged almost parallel to" refers to a state in which the axis line of the long axis of the component (A) and the axis line of the long axis of the molding material lie in the same direction, and the angular deviation between the axis lines is preferably 20° or less, more preferably 10° or less, further preferably 5° or less. The term "substantially the same length" means that, for example, in a pellet-shaped molding material, the component (A) is not cut at some midpoint of the inside of the pellet, or the component (A) significantly shorter than the total length of the pellet is not substantially contained. Although the amount of the component (A) shorter than the total length of the pellet is not particularly defined, it is determined that the component (A) significantly shorter than the total length of the pellet is not substantially contained when the content of the component (A) having a length equal to or less than 50% of the total length of the pellet is 30% by mass or less. Further, the content of the component (A) having a length equal to or less than 50% of the total length of the pellet is preferably 20% by mass or less. The total length of the pellet is a length in a direction along which the component (A) is oriented in the pellet. When the component (A) has a length equivalent to that of the molding material, the length of reinforcing fibers in a molded article can be increased so that excellent dynamic characteristics can be achieved.

Figure 4:
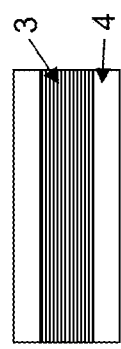
FIG. 4 is a schematic view showing one example of a preferred longitudinal section form of a molding material.
Figure 5:
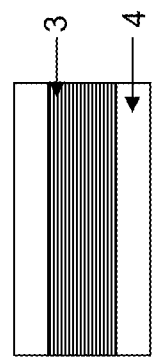
FIG. 5 is a schematic view showing one example of a preferred longitudinal section form of a molding material.

FIGS. 3 to 5 each schematically show one example of a longitudinal section form of the molding material, and FIGS. 6 to 9 each schematically show one example of a transverse section form of the molding material.

The cross section form of the molding material is not limited to the cross section forms shown in the drawings as long as the composite fiber bundle (D) composed of the component (A) and the component (B) is coated with the component (C), but a configuration is preferable in which the composite fiber bundle (D) serves as a core material, and is disposed to be sandwiched by the component (C) in a layered form as shown in FIGS. 3 to 5.

Figure 6:
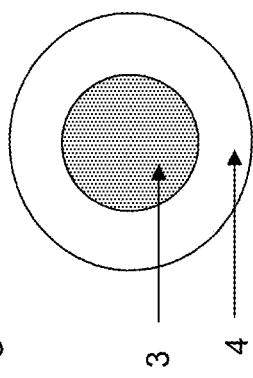
FIG. 6 is a schematic view showing one example of a preferred transverse section form of a molding material.
Figure 7:
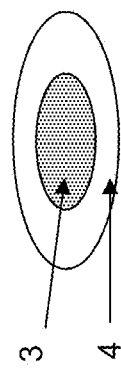
FIG. 7 is a schematic view showing one example of a preferred transverse section form of a molding material.

A configuration is preferable in which the periphery of the composite fiber bundle as a core structure is coated with the component (C) to form a core-sheath structure as shown in FIGS. 6 to 8. When a plurality of composite fiber bundles are coated with the component (C) as shown in FIG. 9, the number of composite fiber bundles (D) is desirable to be about 2 to 6.

The cross section form of the molding material may be such a state that the composite fiber bundle (D) and the component (C) are bonded at the boundary, the component (C) partially enters a part of the composite fiber bundle (D) in the vicinity of the boundary, and the component (C) is compatible with the component (B) that forms the composite fiber bundle (D), or the reinforcing fibers (A) are impregnated with the component (C).

The length of the molding material is preferably 1 to 50 mm, and it is therefore preferable that the above-mentioned production method includes the step of: cutting a composite to a length of 1 to 50 mm after obtaining the composite by bringing the component (C) into contact with the composite fiber bundle (D). By adjusting the molding material to this length, fluidity and handling characteristics during molding can be sufficiently improved. Examples of the particularly preferred form as a molding material cut to an appropriate length as described above may include long fiber pellets for injection molding.

The molding method using a molding material is not particularly limited, and the molding material is applicable to molding methods excellent in productivity such as injection molding, autoclave molding, press molding and stamping molding. These methods can also be used in combination. Integrated molding such as insert molding or outsert molding can also be easily performed. Further, after molding, a correction treatment by heating, and a bonding technique excellent in productivity such as heat welding, vibration welding or ultrasonic welding can also be utilized.

The master batch will now be described in detail.

The master batch contains the thermoplastic resin (C) and the polycarbodiimide compound (B'). First, the components will be described.

Thermoplastic Resin (C)

The thermoplastic resin (C) in the master batch is limited to a resin having high heat resistance, and examples thereof include resins having a glass transition temperature of 140° C. or higher, and super engineering plastics. Specifically, the thermoplastic resin (C) is at least one thermoplastic resin selected from the group consisting of polycarbonate, polyester, polyarylene sulfide, polyamide, polyoxymethylene, polyether imide, polyether sulfone, polyether ketone, polyether ether ketone and polyether ketone ketone. It may be a copolymer or modified product thereof, or a blend of two or more resins.

Polycarbonate

As the polycarbonate, an aromatic polycarbonate, an aliphatic polycarbonate, a cycloaliphatic polycarbonate, and an aromatic-aliphatic polycarbonate can be used.

Polyarylene Sulfide

The polyarylene sulfide is typically a polyphenylene sulfide.

The polyphenylene sulfide is a polymer containing 70 mol % or more, more preferably 90 mol % or more of a structural unit represented by the following structural formula.

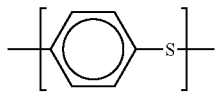

Less than 30 mol % of structural units can be constituted by structural units represented by the following structural formulae.

The melt viscosity of the polyphenylene sulfide is not particularly limited as long as it can be melted and kneaded, but the melt viscosity is preferably low for blending a larger amount of the polycarbodiimide compound in formation of a master batch, and specifically, the melt viscosity is preferably 10 to 50,000 poises (300° C., shear rate: 1,000/second), especially preferably 10 to 5,000 poises.

Polyether Imide

The polyether imide is a polymer containing an aliphatic, cycloaliphatic or aromatic ether unit and a cyclic imide group as repeating units. The polyether imide is not particularly limited as long as it is a polymer having melt moldability. As long as the desired effect is not hindered, the polyether imide may contain a structural unit other than a cyclic imide and an ether bond, for example, an ester unit, an oxycarbonyl unit or the like, on the main chain.

As a specific polyether imide, a polymer represented by the following formula is preferably used.

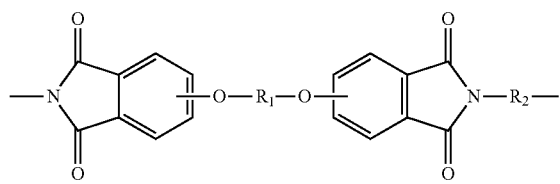

In the above formula, $R_1$ represents a divalent aromatic residue having 6 to 30 carbon atoms, and $R_2$ represents a divalent organic group selected from the group consisting of a divalent aromatic residue having 6 to 30 carbon atoms, an alkylene group having 2 to 20 carbon atoms, a cycloalkylene group having 2 to 20 carbon atoms, and a polydiorganosiloxane group chain-terminated by an alkylene group having 2 to 8 carbon atoms. As the $R_1$ and $R_2$, for example, a group selected from the following formulae is preferably used.

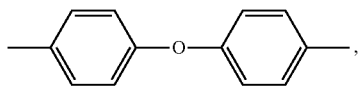

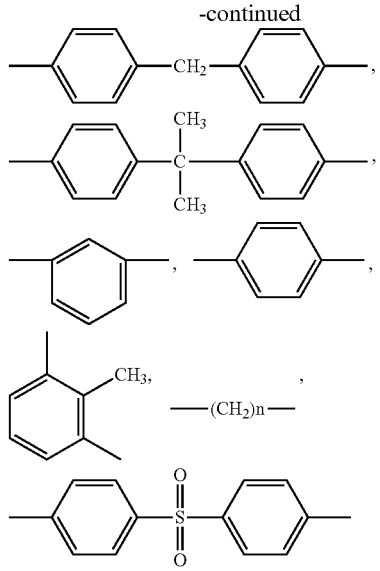

The molecular weight of the polyether imide is not particularly limited, but it is preferable to use a polyether imide having a molecular weight of preferably 30,000 to 120,000, more preferably 40,000 to 110,000, particularly preferably 50,000 to 100,000 in terms of a mass average molecular weight as measured by GPC-MALLS because further excellent toughness is exhibited, particularly excellent toughness is exhibited even at a low temperature, and the high-temperature creep property is considerably improved.

Polyether Sulfone

The polyether sulfone is any of polymers having a backbone in which aromatic groups are bonded by a sulfone group and an ether group. Examples thereof include polyether sulfones including at least one repeating unit selected from the group consisting of the following formulae (X) to (Z).

  (X)

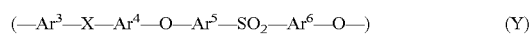  (Y)

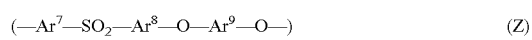  (Z)

In formula (X), $Ar^1$ and $Ar^2$, which are the same or different, each represent an aromatic hydrocarbon group with a carbon number of 6 to 12. In formula (Y), $Ar^3$ to $Ar^6$, which are the same or different, each represent an aromatic hydrocarbon group with a carbon number of 6 to 12, and X represents a divalent hydrocarbon group with a carbon number of 1 to 15. In formula (Z), $Ar^7$ to $Ar^9$, which are the same or different, each represent an aromatic hydrocarbon group with a carbon number of 6 to 12.

The polyether sulfone can be obtained by performing polymerization using a known method. For example, the polyester sulfone can be obtained in the following manner: a monomer having a hydroxyl group and a halogen group at the ends is subjected to polycondensation in an aprotic polar solvent in the presence of an alkali metal carbonic acid salt. For the polyether sulfone, for example, one commercially available as the trademark of "RADEL (registered trademark)" from Solvay Advanced Polymers, Inc., one commercially available as the trademark of "ULTRASON (registered trademark)" from BASF SE, and one commercially available as the trademark of "SUMIKAEXCEL (registered trademark)" from Sumitomo Chemical Company, Limited can be used.

Polyether Ketone, Polyether Ether Ketone and Polyether Ketone Ketone

For the polyether ketone and polyether ether ketone, for example, one commercially available as the trademark of "VICTREX (registered trademark)" from Victrex, Inc. can be used. For the polyether ketone ketone, for example, one commercially available as the trademark of "OXPEKK (registered trademark)" from Oxford Performance Materials, Inc. can be used.

It is preferable that among them, at least one selected from the group consisting of a polyphenylene sulfide, a polyether sulfone and a polyether ketone is used as the thermoplastic resin (C) from the viewpoint of high heat resistance.

Polycarbodiimide Compound (B')

The polycarbodiimide compound (B') is a polycarbodiimide compound having two or more carbodiimide groups in one molecule, and examples thereof may include aliphatic polycarbodiimides and aromatic polycarbodiimides. The above-mentioned component (B-1) and component (B-2) also correspond to the component (B'). The polycarbodiimide compound (B') is not limited to either of an aliphatic polycarbodiimide and an aromatic polycarbodiimide, but it is preferably an aliphatic polycarbodiimide because its carbodiimide group has high reactivity, and resin compositions and molded articles obtained using a master batch containing the aliphatic polycarbodiimide are excellent in dynamic characteristics. The meanings of the aliphatic polycarbodiimide and the aromatic polycarbodiimide are as described above.

Examples of the aromatic polycarbodiimide include "STABAXOL (registered trademark)" P manufactured by Rhein Chemie, Inc. and "STABAXOL (registered trademark)" P400 manufactured by Rhein Chemie, Inc.

The mass average molecular weight of the polycarbodiimide compound (B') is preferably 1,000 to 40,000, more preferably 2,000 to 5,000. It is preferable that the mass average molecular weight of the polycarbodiimide compound (B') is in the above-mentioned range because the effect of improving the dynamic characteristics of a resin composition and a molded article containing the master batch is high. The mass average molecular weight of the polycarbodiimide compound (B') can be determined by an analysis method such as SEC (size exclusion chromatography). The method of synthesizing a polycarbodiimide compound to be used is not particularly limited and, for example, a synthesis method as mentioned in the description of the molding material described above is used.

In the master batch, the blending ratio of the thermoplastic resin (C) and the polycarbodiimide compound (B') is (A): (B')=40 to 90% by mass: 10 to 60% by mass. The content of the polycarbodiimide compound (B') is preferably 20 to 50% by mass, more preferably 30 to 40% by mass to achieve the original purpose of the master batch, i.e. obtaining a sufficient effect by adding to an intended matrix resin a small amount of the master batch containing additives in a high concentration. When the content of the polycarbodiimide compound (B') is less than 10% by mass, it is hard and difficult to obtain a sufficient effect from additives by adding a small amount of the master batch. When the content of the polycarbodiimide compound (B') is more than 60% by mass, blocking and bridging occur in a high-temperature molding process so that the handling characteristics of the master batch are deteriorated. Further, since the amount of the polycarbodiimide compound (B') existing on the surface of the master batch increases, the essential addition effect of the polycarbodiimide compound can be no longer exhibited due to water absorption/moisture absorption during storage, and storage conditions are constrained by, for example, the necessity of vacuum storage or sealed storage.

One example of the method of obtaining the master batch may be, for example, a method in which melting and kneading is performed using an extruder. Examples of the extruder may include single-screw extruders and twin-screw extruders, and of them, twin-screw extruders which are excellent in kneading performance can be preferably used. Examples of the twin-screw extruder may include those in which the ratio of the screw length L to the screw diameter D (L/D) is 20 to 100. Further, the screw of the twin-screw extruder is generally formed by combining screw segments different in length and shape feature such as a full-flight and a kneading disk, and it is preferable that at least one kneading disk is included for improving kneading performance and reducing time. The cylinder temperature in melting and kneading is preferably 300 to 400° C., more preferably 320 to 400° C. for improving kneading performance.

In the first aspect of the master batch, a morphology of a sea-island structure is formed in which islands of the polycarbodiimide compound (B') are dispersed in the sea of the thermoplastic resin (C) and the average particle size of the dispersed particles of the polycarbodiimide compound (B') is 1 to 100 To integrate two or more materials to improve handling characteristics, the average particle size of the dispersed particles is preferably 10 to 90 more preferably 20 to 80 When the average particle size of the dispersed particles is less than 1 the chemical reaction of the polycarbodiimide compound (B') with the thermoplastic resin (C) excessively proceeds in the thermoplastic resin (C) so that the amount of carbodiimide groups of the polycarbodiimide compound (B') contained in the master batch decreases to reduce the effect of improving the dynamic characteristics of a molded article by additives. When the average particle size of the dispersed particles is more than 100 the amount of the polycarbodiimide compound (B') exposed to the surface of the master batch becomes relatively large so that the possibility of occurrence of blocking and bridging in the master batch is increased, leading to deterioration of handling characteristics.

In a second example of the master batch, a morphology is formed in which the polycarbodiimide compound (B') has a continuous structure in the thermoplastic resin (C) and the average thickness of a continuous phase composed of the polycarbodiimide compound (B') is 1 to 100 μm. The "average thickness of the continuous phase" is a thickness determined in the following manner: the shortest distance from a certain thermoplastic resin (Cn) to the closest thermoplastic resin (Cm) through the polycarbodiimide compound (B') is defined as a thickness of the continuous phase of the polycarbodiimide compound (B'), and the thickness of the continuous phase is measured at a plurality of locations, and an average thereof is calculated. To integrate two or more materials to improve handling characteristics, the average particle thickness of the continuous phase is preferably 10 to 90 μm, more preferably 20 to 80 μm. When the average thickness of the continuous phase is less than 1 μm, it is difficult to increase the content of the polycarbodiimide compound (B'), and the original purpose of the master batch cannot be achieved. When the average thickness of the continuous phase is more than 100 μm, conversely the dispersion state becomes uneven, and thus the shape of the master batch is lost during handling so that the possibility of occurrence of blocking and bridging in the master batch is increased, leading to deterioration of handling characteristics. Examples of the method of observing the morphology may include a method in which the morphology is observed with a transmittance electron microscope.

Preferably, the exposure degree (Sb/S) of the area (Sb) of the polycarbodiimide compound (B') appearing on the surface of the master batch, in the surface area (S) of the master batch, and the ratio (Vb/V) of the volume (Vb) of the component (B') in the master batch to the total volume (V) of the master batch satisfy the following formulae (1) and (2).

$$(Sb/S) \leq 0.3 \quad (1)$$

$$(Sb/S) < (Vb/V) \quad (2)$$

Specifically, in the vicinity of a material inlet (hopper) of a molding machine to be used in a high-temperature molding process, a device that circulates cooling water or lowers the set temperature in the vicinity of the inlet is generally used to suppress occurrence of blocking, but in the high-temperature molding process, the set temperature should be increased to melt a thermoplastic resin having high heat resistance and, thus, the surface temperature in the vicinity of the material inlet increases due to heat conduction. Therefore the amount of the polycarbodiimide compound (B') existing on the surface of the master batch is preferably small, and a master batch satisfying the above formulae (1) and (2) can meet this requirement.

The polycarbodiimide compound (B') to be contained often has a lower melting point as compared to the thermoplastic resin (C), and to improve handling characteristics by reducing occurrence of blocking in a high-temperature molding process, the exposure degree (Sb/S) of the area (Sb) is preferably 0.2 or less, more preferably 0.1 or less. Similarly, the relationship between the exposure degree (Sb/S) of the area (Sb) and the ratio (Vb/V) of the volume (Vb) is preferably less than (0.8×(Vb/V)), more preferably less than (0.5×(Vb/V)). The ratio (Vb/V) of the volume (Vb) is a threshold value proportional to the component ratio of the polycarbodiimide compound (B'), and it is preferable that with respect to the ratio of the polycarbodiimide compound (B') to be contained, the exposure degree (Sb/S) of the polycarbodiimide compound (B') is less than the threshold value to reduce occurrence of blocking in a high-temperature process.

As the shape of the master batch, columns are preferable, and examples of the column with the bottom surface having a circular shape include cylinders, circular cones, curved cylinders and cylinders having a constriction. Among them, columns having a constant cross section shape (cylinders when the shape of the bottom surface is circular) are more preferable from the view point of handling characteristics and productivity. Examples of the shape of the bottom surface include a circular shape, an elliptical shape, a triangular shape, a quadrate shape, a rectangular shape, a polygonal shape and a planetary shape. The shape of the bottom surface is preferably circular or elliptical for suppressing occurrence of bridging.

In the shape of the master batch, the long diameter of the cross section is preferably 1 to 10 mm. The "long diameter of the cross section" refers to a diameter of a circumscribed circle drawn in a direction perpendicular to the length direction of a pellet when the pellet is formed using a master batch. The long diameter of the cross section is preferably 1 to 8 mm, more preferably 2 to 5 mm. It is more preferable to match the long diameter of the cross section to the long diameter of the cross section of the matrix resin pellet to which the master batch is added.

In the shape of the master batch, the aspect ratio is preferably 1 to 10. The "aspect ratio" refers to a ratio of the long diameter Dm of the cross section and the length Lm of a master batch as described later. In the molding process, the aspect ratio is preferably 1 to 8, more preferably 1 to 5 to suppress occurrence of bridging.

In the shape of the master batch, the long diameter/short diameter ratio of the cross section is preferably 1 to 2. The "short diameter of the cross section" refers to a diameter of an inscribed circle drawn in a direction perpendicular to the length direction of the master batch. In the molding process, the long diameter/short diameter ratio of the cross section is preferably 1 to 1.8, more preferably 1.2 to 1.5 to suppress occurrence of bridging.

Examples of the functional group in the thermoplastic resin (C) may include a thiol group, an epoxy group, a carboxyl group, metal salts of a carboxyl group, an amino group, a hydroxyl group, an isocyanate group, an oxazoline group and a sulfonic acid group. Among them, from the viewpoint of reactivity with a carbodiimide group, a thiol group, an epoxy group, a carboxyl group, metal salts of a carboxyl group, an amino group and a hydroxyl group are preferable for the purpose of improving the strength of the resulting molded article in use of the thermoplastic resin (C) in the form of a master batch, and a thiol group, a carboxyl group and a hydroxyl group are especially preferable.

In the polycarbodiimide compound (B'), the thermal mass decrease at 350° C. is preferably 5% or less for the purpose of improving the strength of the resulting molded article in use of the polycarbodiimide compound (B') in the form of a master batch. The thermal mass decrease is more preferably 4% or less, further preferably 3% or less.

The master batch may contain 0 to 30% by mass of a polyurea compound (E) having two or more urea structures in one molecule. Adhesion between a resin and reinforcing fibers in a resin composition and a molded article that are obtained using the master batch can be further improved.

As a compound having urea structures, one obtained by reacting a diisocyanate with a diamine including a compound containing a plurality of amino groups (e.g. hydrazine, dihydrazine or the like) can be used. Alternatively, the polyurea can be synthesized by reacting an isocyanate with water to form unstable carbamic acid. Carbamic acid is decomposed to generate carbon dioxide, and forms an amino group which immediately reacts with an excessive isocyanate to form a urea bridge. A compound having urea structures is also obtained by treating a compound, which has a carbodiimide structure, with water to convert carbodiimide into urea.

Other Additives

The master batch may contain an impact resistance improving agent such as an elastomer or a rubber component and other filling materials and additives as long as the desired effect is not impaired. Examples of the additives include flame retardants, conductivity imparting agents, crystal nucleating agents, ultraviolet absorbents, antioxidants, vibration controlling agents, antibacterial agents, insect repellents, deodorants, coloration preventing agents, heat stabilizers, mold release agents, antistatic agents, plasticizers, lubricants, colorants, pigments, dyes, foaming agents and foam inhibitors.

The master batch can be added to other thermoplastic resins and fiber-reinforced resin compositions. Other thermoplastic resins are not particularly limited, but a resin composition that is the same as the thermoplastic resin (C)

used in the master batch is preferable, and a thermoplastic resin composition having a functional group reactive to the polycarbodiimide compound (B') and a fiber-reinforced resin composition containing reinforcing fibers are preferable.

The reinforcing fibers to be used in a fiber-reinforced resin composition containing the master batch are not particularly limited, and those similar to the reinforcing fibers that form the component (A) can be used. Carbon fibers which ensure a reduction in weight and an increase in rigidity of a molded article and which are excellent in specific modulus and specific strength are especially preferable. These reinforcing fibers may be surface-treated. Examples of the surface treatment include a metal deposition treatment, a treatment with a coupling agent, a treatment with a sizing agent and an additive deposition treatment. As the sizing agent, one similar to the sizing agent (s) described above can be used. As a form of reinforcing fibers, for example, fiber structures such as long fibers aligned in the same direction, a single tow, a woven fabric, a knit, a nonwoven fabric, a mat and a braid can be used.

Molded Article Obtained by Molding Molding Material, and Molded Article Employing Resin Composition Produced Using Master Batch Molded articles obtained by molding the molding material, and molded articles employing a resin composition produced using the master batch, particularly a fiber-reinforced resin composition, are suitably used in the following applications.

The above-mentioned molded articles are suitable as electronic device cases, and are suitably used in cases for computers (including personal computers), mobile phones, televisions, cameras, audio players and the like, and also suitably used in members for electric/electronic devices as represented by a keyboard support that is a member supporting a keyboard in a personal computer. Particularly, in the members for electric/electronic devices, carbon fiber bundles having conductivity are more preferably used as reinforcing fibers because an electromagnetic wave shielding property is imparted.

The above-mentioned molded articles are suitable for electric and electronic component applications, and are suitably used in connectors, LED lamps, sockets, optical pickups, terminal plates, printed boards, speakers, small motors, magnetic heads, power modules, power generators, electric motors, transformers, current transformers, voltage regulators, rectifiers, inverters and the like.

The above-mentioned molded articles are suitable for home/office electric appliance components, and are suitably used in telephones, facsimile apparatuses, VTRs, copiers, televisions, microwave ovens, audio equipment, toiletry goods, laser discs (registered trademark), refrigerators, air conditioners and the like.

The above-mentioned molded articles are suitable for automobile components, and vehicle related components, members and outer plates, and are suitably used in safety belt components, instrument panels, console boxes, pillars, roof rails, fenders, bumpers, door panels, roof panels, hood panels, trunk lids, door mirror stays, spoilers, hood louvers, wheel covers, wheel caps, garnishes, intake manifolds, fuel pumps, engine cooling water joints, wind washer nozzles, wipers, battery peripheral components, wire harness connectors, lamp housings, lamp reflectors, lamp sockets, door beams, under-covers, pedal housings, radiator supports, spare tire covers, front ends, cylinder head covers, bearing retainers, pedals and the like.

The above-mentioned molded articles are suitable for aircraft related components, members and outer plates, and are suitably used in landing gear pods, winglets, spoilers, edges, rudders, fairing devices, ribs and the like.

The above-mentioned molded articles are suitable as building materials, and are suitably used in wall, roof and ceiling material related components, window material related components, heat insulator material related components, floor material related components, base isolation vibration damping member related components, lifeline related components and the like in civil engineering and construction products.

The above-mentioned molded articles are suitable as tools, and are suitably used in wrenches and the like.

The above-mentioned molded articles are suitable as sports goods, and are suitably used in golf related goods such as golf club shafts and golf balls, sports racket related goods such as tennis rackets and badminton rackets, body protection goods for sports such as masks, helmets, chest protectors, elbow pads and kneepads for American football, baseball, softball, and the like, fishing tackle related goods such as fishing rods, reels and fishing lures, winter sports related goods such as skis and snowboards.

EXAMPLES

Our materials, methods and master batches will be described further in detail below by way of examples, but this disclosure is not intended to be limited to these examples.

First, methods of measuring various properties, which are used in the examples, will be described.

(1) Measurement of Melt Viscosity

A sample to be measured was measured by a viscoelasticity measurement device. The melt viscosity at 50° C. or 150° C. is measured at 0.5 Hz by using 40 mm parallel plates.

(2) Measurement of Viscosity Change Rate after Heating at 150° C. for 2 Hours

A sample to be measured was left standing in a hot air drier at 150° C. for 2 hours, the melt viscosity was then measured in the same manner as in (1), and the viscosity change rate at 150° C. was calculated.

(3) Measurement of Void Content of Composite Fiber Bundle

The void content (%) of a composite fiber bundle was calculated in accordance with the test method in ASTM D2734 (1997). The void content of the composite fiber bundle was evaluated based on the following criteria, and samples meeting any one of the criteria A to C were determined to be passing.

A: 0 to less than 5%
B: 5% or more and less than 20%
C: 20% or more and less than 40%
D: 40% or more (4) Bending Test of Molded Article Obtained Using Molding Material The bending strength was measured under the test condition of a crosshead speed of 5.3 mm/minute with the support span set to 100 mm using a three-point testing tool (penetrator: 10 mm, supporting point: 10 mm) in accordance with ASTM D790 (1997). "INSTRON (registered trademark)" Universal Tester Model 4201 (manufactured by Instron, Ltd.) was used as a tester.

The bending strength was evaluated based on the following criteria, and samples meeting any one of the criteria A to C were determined to be passing.

A: 300 MPa or more
B: 270 MPa or more and less than 300 MPa
C: 240 MPa or more and less than 270 MPa
D: less than 240 MPa (5) Measurement of Blocking Resistance of Molding Material A molding material in an amount of 300 cc was measured using a graduated cylinder 5 with an inner diameter of 60 mm as shown in FIG. 10(a), and the mass (m1) of the molding material was also measured. After the measurement, a lid 7 was put on the molding material and a 1 kg plumb 8 was placed thereon as shown in FIG. 10(b) so that a load was applied for 5 minutes. Thereafter, the graduated cylinder was reversed as shown in FIG. 10(c) and FIG. 10(d), and was left standing for about 30 seconds. The mass (m2) of the molding material remaining in the graduated cylinder was measured. The blocking resistance of the molding material was measured from these masses and the following formula.

$$(m1-m2)/m1 \times 100(\%)$$

The blocking resistance was evaluated based on the following criteria, and samples meeting any one of the criteria A to C were determined to be passing.

A: 100%
B: 90% or more and less than 100%
C: 70% or more and less than 90%
D: less than 70%

Figure 11:
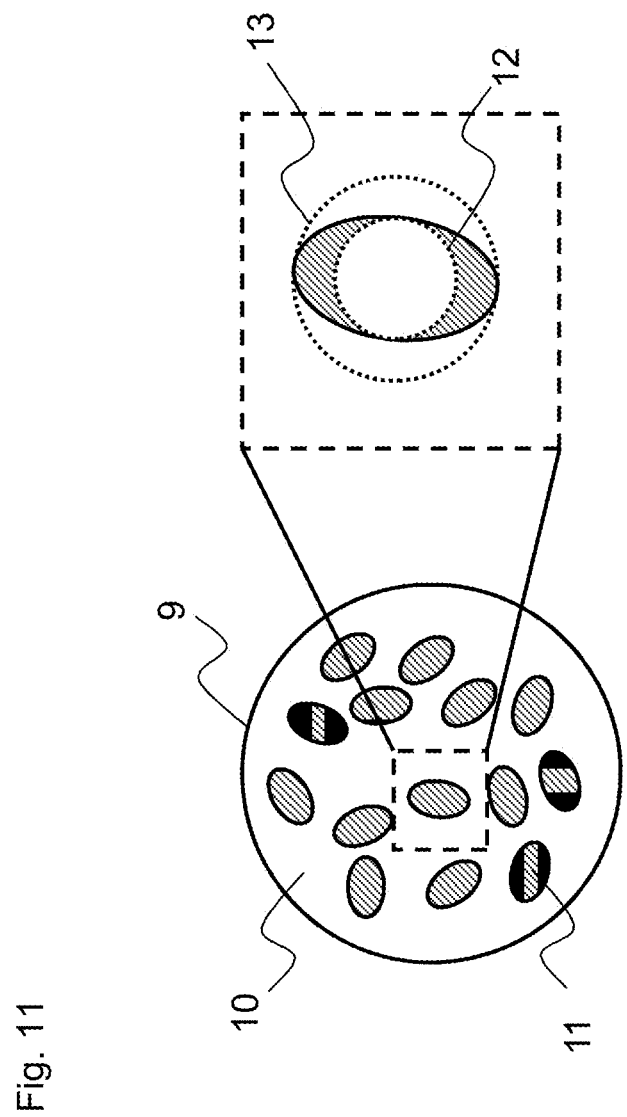
FIG. 11 is a schematic diagram of a morphology of a master batch according to a first example.

(6) Measurement of Average Particle Size of Dispersed Particles of Polycarbodiimide Compound (B') in Master Batch The obtained master batch was cut in a direction perpendicular to its length direction, a thin section of 0.1 μm or less was cut out from the central part of the cross section at −20° C., and observed at a magnification of 400 with a transmission electron microscope Model H-7100 manufactured by Hitachi, Ltd., and 50 components (B') were randomly selected. As shown in FIG. 11, the diameters of the circumscribed circle and the inscribed circle for each of the 50 components (B') were measured, the average of the diameters was defined as a dispersed particle size of each component (B'), and the average of the dispersed particle sizes was then defined as an average particle size thereof.

(7) Measurement of Average Thickness of Continuous Phase of Polycarbodiimide Compound (B') in Master Batch Similarly to the measurement of the average particle size of dispersed particles of the polycarbodiimide compound (B'), a thin section of the master batch was cut out, and observed at a magnification of 400 with a transmission electron microscope Model H-7100 manufactured by Hitachi, Ltd., 50 thermoplastic resins (C) were randomly selected, the shortest distance from a certain thermoplastic resin ($C_n$) to the closest thermoplastic resin ($C_m$) through the polycarbodiimide compound (B') as shown in FIG. 12 was defined as a thickness of the continuous phase, and the average of the thicknesses was then defined as an average thickness.

(8) Measurement of Long Diameter of Cross Section of Master Batch

Randomly selected 50 master batches were embedded in an epoxy resin such that it was able to observe the master batches in a direction perpendicular to the length direction, and after the epoxy resin was cured, the observation surface was polished to prepare a cross section observation sample. The whole cross section of the master batch was photographed at a magnification of 200 using an ultra-depth color 3D shape measurement microscope VK-9500 (controller section)/VK-9510 (measurement section) (manufactured by KEYENCE CORPORATION). The diameter of the circumscribed circle of the master batch was measured using an analysis application VK-H1A9 from an image obtained by photographing the whole cross section. Thereafter, the average thereof was calculated, and defined as a long diameter of the master batch.

(9) Calculation of Aspect Ratio of Master Batch

The length of the master batch in the length direction was measured in micrometer, and the maximum value thereof was defined as a length Lm of the master batch. The aspect ratio Am of the master batch was calculated from the long diameter Dm of the cross section and the length Lm of the master batch and the following formula (3).

$$Am = \frac{Lm}{Dm} \quad (3)$$

(10) Calculation of Long Diameter/Short Diameter Ratio of Master Batch

Using the cross section observation sample prepared in (7), the diameter of the inscribed circle of the master batch was similarly measured using an analysis application VK-H1A9 from an image obtained by photographing the whole cross section, and the average thereof was defined as a short diameter of the cross section. The long diameter/short diameter ratio of the master batch was calculated from the long diameter Dml and the short diameter Dms of the cross section of the master batch and the following formula (4).

$$\text{long diameter/short diameter ratio} = \frac{Dml}{Dms} \quad (4)$$

(11) Measurement of Exposure Degree (Sb/S) of Polycarbodiimide Compound (B') in Master Batch Similarly to the measurement in (5), a thin section at a certain point was cut out, the outer periphery of the master batch was observed at a magnification of 400 with a transmission electron microscope Model H-7100 manufactured by Hitachi, Ltd., and the length (Lb) constituted by the polycarbodiimide compound (B') was measured. Since it takes a long time to measure the area (Sb) of the polycarbodiimide compound (B') for the whole surface of the master batch, the length (L) of the outer periphery of a certain cross section of the master batch and the length (Lb) constituted by the polycarbodiimide compound (B') may be measured for the sake of convenience. The exposure degree was calculated using the length (L) and the length (Lb). The average of values calculated using the length (L) of the outer periphery of the master batch and the length (Lb) for 50 cross sections measured in this manner, and the following formula (5) was defined as an exposure degree (Sb/S) of the polycarbodiimide compound (B').

$$(Sb/S) = \frac{Lb}{L} \quad (5)$$

The ratio (Vb/V) of the volume (Vb) of the polycarbodiimide compound (B') to the volume (V) of the master batch was calculated from the following formula (6) using the mass % (Wc) and specific gravity ρc of the thermoplastic resin (C) and the mass % (Wb) and specific gravity ρb of the polycarbodiimide compound (B').

$$(Vb/V) = \left( \frac{(Wb/\rho b)}{(Wc/\rho c) + (Wb/\rho b)} \right) \quad (6)$$

(12) Measurement of Thermal Mass Decrease of Component (B')

In a thermogravimeter (manufactured by TA Instruments, Inc.), the temperature was elevated at a rate of 10° C./min from 30° C. to 400° C. in an atmosphere of 100 ml/min of nitrogen, and the thermal mass decrease was measured from the following formula (7) from the mass Me at the time when the temperature reached 350° C. using as a reference the mass Ms at 100° C.

$$\left( \frac{(Ms - Me)}{Ms} \right) \times 100 \quad (7)$$

(13) Measurement of Flow Time of Master Batch

In accordance with JIS K6935-2, a funnel 12 in which the inner diameter 13 of the bottom surface part was 60 mm as shown in FIG. 13(a) was provided. The master batch in an amount of 300 cc was measured using a graduated cylinder. The bottom surface part was closed with a lid 14, and the master batch was added in the funnel 12, the surface temperature of which was adjusted to 100° C. After 3 minutes, the lid 14 was removed as shown in FIG. 13(b), the time until all the master batch flowed out of the funnel 12 was measured.

For evaluation, samples were rated "excellent" when the flow time of the master batch was 5 seconds or less, samples were rated "good" when the flow time of the master batch was more than 5 seconds and not more than 10 seconds, samples were rated "fair" when the flow time of the master batch was more than 10 seconds and not more than 20 seconds, and samples were rated "bad" when the flow time of the master batch was more than 20 seconds or all the material did not flow, the flow time of the master batch being determined by the above-mentioned measurement.

(14) Measurement of Blocking Property in Master Batch

The master batch in an amount of 300 cc was measured using a graduated cylinder 5 with an inner diameter of 60 mm as shown in FIG. 10(a), and the mass (M1) of a master batch was also measured. After the measurement, a lid 7 was put on the master batch and a 1 kg plumb 8 was placed thereon as shown in FIG. 10(b) so that a load was applied for 5 minutes. Thereafter, the graduated cylinder was reversed as shown in FIG. 10(c) and FIG. 10(d), and was left standing for about 30 seconds. The mass (M2) of the master batch remaining in the graduated cylinder was measured. The blocking property of the master batch was measured from these masses and the following formula (8).

$$\left( \frac{M1 - M2}{M1} \right) \times 100 \quad (8)$$

For evaluation, samples were rated "excellent" when the calculated value was 100%, samples were rated "good" when the calculated value was 90% or more and less than 100%, samples were rated "fair" when the calculated value was 70% or more and less than 90%, and samples were rated "bad" when the calculated value was less than 70%.

(15) Dynamic Characteristic Deterioration Rate Associated with Water Absorption/Moisture Absorption in Master Batch A master batch 1 and a master batch 2 each weighed to 300 g were provided, the master batch 1 was dried in a vacuum drier at 25° C., and the master batch 2 was caused to acceleratingly absorb moisture in a thermohygrostat bath at 25° C. and a relative humidity of 80%. After 24 hours, each master batch was taken out, and dry-blended with a matrix resin, and a Type-I dumbbell test piece conforming to ASTM D638 was formed using an injection molding machine (J150EII-P from JSW, Inc.). The test piece formed by blending the master batch 1 was defined as a molded article 1, and the test piece formed by blending the master batch 2 was defined as a molded article 2.

The obtained molded articles 1 and 2 were annealed at 150° C. for 2 hours, then air-cooled, and subjected to the test. The obtained Type-I dumbbell test piece was used as each molded article in accordance with ASTM D638, and "INSTRON (registered trademark)" Universal Tester (manufactured by Instron, Ltd.) was used as a tester. The tensile strength is a value obtained by dividing the load at a breaking point by the cross-sectional area. The tensile strength of the molded article 1 was defined as σ1, and the tensile strength of the molded article 2 was defined as σ2.

The dynamic characteristic deterioration rate of the master batch was calculated from the obtained tensile strength value and the following formula (9).

$$\left( \frac{(\sigma 2 - \sigma 1)}{\sigma 1} \right) \times 100 \quad (9)$$

For evaluation, the molded articles were rated "excellent" when the calculated value was less than 5%, the molded articles were rated "good" when the calculated value was 5% or more and less than 10%, the molded articles were rated "fair" when the calculated value was 10% or more and less than 20%, and the molded articles were rated "bad" when the calculated value was 20% or more.

Materials used in the examples will now be described.

The reinforcing fibers (A) used in the examples and comparative examples are as follows.

(Reinforcing fibers-1) A copolymer mainly composed of polyacrylonitrile was subjected to spinning, a firing treatment and a surface oxidation treatment to obtain a continuous carbon fiber strand with a total single-yarn number of 12,000. The properties of the carbon fibers are as shown below.

Tensile strength: 4,900 MPa
Tensile modulus: 240 GPa
Tensile elongation: 2%
Specific gravity: 1.8
Single-yarn diameter: 7 μm
Surface oxygen concentration ratio [O/C]: 0.12

The surface oxygen concentration ratio was determined by X-ray photoelectron spectroscopy in accordance with the following procedure using carbon fibers after the surface oxidation treatment was performed. First, a carbon fiber bundle was cut to 20 mm, and spread and arranged on a sample support stand made of copper, and the inside of a sample chamber was then kept at $1 \times 10^8$ Torr while AlKα$_{1,2}$ was used as an X ray source. As a correction value of a peak associated with charging during measurement, the kinetic energy value (K.E.) at the main peak of $C_{1s}$ was matched to 1202 eV. The $C_{1s}$ peak area was determined by drawing a straight base line over 1191 to 1205 eV as the value K.E. The $O_{1s}$ peak area was determined by drawing a straight base line over 947 to 959 eV as the value K.E. The surface oxygen concentration ratio was calculated as a ratio of the number of atoms from the ratio of the $O_{1s}$ peak area to the $C_{1s}$ peak area using a sensitivity correction value specific to an apparatus. Model ES-200 manufactured by Kokusai Electric Inc. was used as an X-ray photoelectron spectrometer, and the sensitivity correction value was set to 1.74.

The sizing agents (s) used in the examples and the comparative examples are as follows.

(s)-1 Glycerol triglycidyl ether (manufactured by Wako Pure Chemical Industries, Ltd.)
   Mass average molecular weight: 260
   Number of epoxy groups per one molecule: 3
   Value obtained by dividing the mass average molecular weight by the total number of carboxyl groups, amino groups, hydroxyl groups, epoxy groups and hydroxyl groups: 87

(s)-2 Bisphenol A diglycidyl ether (Manufactured by SIGMA-ALDRICH, Inc.)
   Mass average molecular weight: 340
   Number of epoxy groups per one molecule: 2
   Value obtained by dividing the mass average molecular weight by the total number of carboxyl groups, amino groups, hydroxyl groups, epoxy groups and hydroxyl groups: 170

(s)-3 (3-glycidyloxypropyl)triethoxysilane (Manufactured by SIGMA-ALDRICH, Inc.)
   Mass average molecular weight: 278
   Number of epoxy groups per one molecule: 1
   Value obtained by dividing the mass average molecular weight by the total number of carboxyl groups, amino groups, hydroxyl groups, epoxy groups and hydroxyl groups: 278

(s)-4 N,N'-dicyclohexylcarbodiimide (manufactured by Wako Pure Chemical Industries, Ltd.) (carbodiimide group equivalent: 206, mass average molecular weight: 206)

The components forming the component (B) used in the examples and the comparative examples are as follows. The viscosity at 50° C. was measured in accordance with the measurement method (1), and for the softening temperature, values described in catalogs were shown. The (B-1) and component (B-2) also correspond to the component (B').

(B-1) Polycarbodiimide compound that is liquid at 50° C.

(B-1)-1 Aliphatic polycarbodiimide "CARBODILITE (registered trademark)" V-02B (manufactured by Nisshinbo Chemical Inc.) (viscosity at 50° C.: 12.8 Pa·s)

(B-1)-2 Aliphatic polycarbodiimide "CARBODILITE (registered trademark)" V-04K (manufactured by Nisshinbo Chemical Inc.) (viscosity at 50° C.: 0.68 Pa·s)

(B-1)-3 Aliphatic polycarbodiimide "ELASTOSTAB (registered trademark)" H01 (manufactured by Nisshinbo Chemical Inc.) (viscosity at 50° C.: 2.81 Pa·s)

(B-2) Polycarbodiimide compound that is solid at 50° C.

(B-2)-1 Aliphatic polycarbodiimide "CARBODILITE (registered trademark)" HMV-15CA (manufactured by Nisshinbo Chemical Inc.) (solid at 50° C., softening temperature: 70° C.)

(B-2)-2 Aromatic polycarbodiimide "STABAXOL" (registered trademark)" P (manufactured by Rhein Chemie, Inc.) (solid at 50° C., softening temperature: 60° C. to 90° C.)

(B-2)-3 Aliphatic polycarbodiimide "CARBODILITE (registered trademark)" HMV-8CA (manufactured by Nisshinbo Chemical Inc.) (carbodiimide group equivalent: 278, mass average molecular weight: 3,000)

(B-2)-4 Aromatic polycarbodiimide "STABAXOL" (registered trademark)" P400 (manufactured by Rhein Chemie, Inc.) (mass average molecular weight: 20,000)

(B-3) Other components that form component (B)

(B-3)-1 Bisphenol A type epoxy resin "JER (registered trademark)" 828 (manufactured by Mitsubishi Chemical Corporation) (viscosity at 50° C.: 0.69 Pa·s)

(B-3)-2 N,N'-dicyclohexylcarbodiimide (manufactured by Wako Pure Chemical Industries, Ltd.) (viscosity at 50° C.: 0.02 Pa·s) (compound identical to sizing agent (s)-4)

(B-3)-3 Mixture obtained by mixing 15 parts by mass of dicyandiamide DICY7T (manufactured by Mitsubishi Chemical Corporation) and 2 parts by mass of 3-(3,4-dichlorophenyl)-1,1-dimethylurea DCMU99 (manufactured by HODOGAYA CHEMICAL CO., LTD.) with 100 parts by mass of bisphenol A type epoxy resin "JER (registered trademark)" 828 (manufactured by Mitsubishi Chemical Corporation) (viscosity at 50° C.: 1.12 Pa·s)

The (C) components used in the examples and the comparative examples are as follows.

(C)-1 Polyphenylene sulfide (melting point: 285° C., mass average molecular weight: 30,000, acid terminal product, chloroform extraction amount: 0.5% by mass)

(C)-2 Polycarbonate "IUPILON (registered trademark)" H-4000 (manufactured by Mitsubishi Engineering-Plastics Corporation) (glass transition temperature: 145° C., mass average molecular weight: 34,500)

(C)-3 Polyphenylene sulfide (pellet) having a melting point of 285° C.

(C)-4 Nonwoven fabric composed of polyphenylene sulfide fibers having a fiber diameter of 8 μm (C)-5 Nonwoven fabric composed of polyphenylene sulfide fibers having a fiber diameter of 4 μm (C)-6 "SUMIKAEXCEL (registered trademark)" 4100G (manufactured by Sumitomo Chemical Company, Limited), polyether sulfone (C)-7 "VICTREX (registered trademark)" HT G22 (manufactured by Victrex plc.), polyether ketone Reference Example 1 Method of Adding Sizing Agent to Reinforcing Fibers A fiber bundle of reinforcing fibers (A) was continuously taken over, immersed in an aqueous sizing mother liquor containing 1% by mass of a sizing agent (s), and then heated and dried at 230° C. to obtain reinforcing fibers (A) with the sizing agent (s) deposited thereon. The deposition amount of the sizing (s)-1 after drying was adjusted to 0.5 parts by mass based on 100 parts by mass of the reinforcing fibers (A).

Reference Example 2 Method of Producing Composite Fiber Bundle (D)

A film of a liquid obtained by heating and melting an impregnated agent (component (B)) was formed on a roll heated to a coating temperature. A reverse roll was used to form a film on the roll in a constant thickness. A continuous component (A) was caused to pass over the roll while being in contact with the roll so that the impregnated agent was deposited on the component (A). Next, the component (A) was caused to pass through the gap of each of five pairs of roll presses having a diameter of 50 mm in a chamber heated to an impregnation temperature. Through this operation, the fiber bundle was impregnated with the impregnated agent up to the inside thereof to form a composite fiber bundle (D)

having a predetermined blending amount of the impregnated agent. The take-over speed during production of the composite fiber bundle (D) was 30 m/minute.

Reference Example 3 Method of Producing Molding Material

The composite fiber bundle (D) obtained in Reference Example 2 was caused to pass through the inside of a coating die for a wire coating method, which was installed at the end of Twin-Screw Extruder Model TEX-30α (screw diameter: 30 mm, L/D=32) manufactured by The Japan Steel Works, Ltd., and the composite fiber bundle (D) was continuously disposed such that the melted component (C) was discharged from the extruder into the die to coat the periphery of the composite fiber bundle. The amounts of the composite fiber bundle (D) and the component (C) were adjusted to achieve a desired reinforcing fiber content. The obtained continuous molding material was cooled and then cut by a cutter to form a molding material in the form of a long fiber pellet having a length of 7 mm. The take-over speed during production of the molding material was 30 m/minute.

Reference Example 4 Method of Forming Molded Article

The obtained molding material was dried under vacuum at 140° C. for 5 hours or more. Using Injection Molding Machine Model J150EII-P manufactured by The Japan Steel Works, Ltd., the molding material obtained after drying was molded using a die for each test piece. For injection molding conditions, the cylinder temperature was 320° C. and the die temperature was 150° C. when the component (C) was polyphenylene sulfide, and the cylinder temperature was 300° C. and the die temperature was 120° C. when the component (C) was polycarbonate. The maximum pressure in injection molding was defined as an injection molding pressure. Test pieces in a dried state, which were stored in a desiccator at room temperature for 3 hours after being annealed at 120° C. for 3 hours, were evaluated.

Examples 1-1 to 1-13, Comparative Examples 1-1 to 1-4 and Comparative Examples 1-6 to 1-10

With the compositions described in Tables 1 and 2 and under the conditions shown in the tables, long fiber pellets were prepared in accordance with Reference Examples 1 to 3, and test pieces for evaluation of properties (molded articles) were formed by injection molding in accordance with Reference Example 4. In any of the examples and the comparative examples, the process in Reference Example 2 and the process in Reference Example 3 were continuously carried out online.

The evaluation results are collectively shown in Tables 1 and 2.

In Comparative Example 1-1, the viscosity of the component (B) was high so that the composite fiber bundle (D) was not obtained and, thus, a molding material was not obtained. In Comparative Example 1-10, the component (B) was cured in the coating/impregnation step (the viscosity change rate after heating at 150° C. for 2 hours was more than 2) so that the composite fiber bundle (D) was not obtained and, thus, a molding material was not obtained.

Comparative Example 1-5

With the composition described in Table 2 and under the conditions shown in the table, the component (B) was not used, and reinforcing fibers (A) with a sizing agent deposited thereon in accordance with Reference Example 1 were directly used in place of the composite fiber bundle (D) of Reference Example 3 to prepare a long fiber pellet. The impregnation property of the component (C) to the reinforcing fiber bundle was poor so that fuzz occurred considerably during pelletization and, thus, a molding material was not obtained.

TABLE 1

| | | | Example 1-1 | Example 1-2 | Example 1-3 | Example 1-4 | Example 1-5 | Example 1-6 | Example 1-7 |
|---|---|---|---|---|---|---|---|---|---|
| Component (A) | Type | — | Reinforcing fibers-1 | Reinforcing fibers-1 | Reinforcing fibers-1 | Reinforcing fibers-1 | Reinforcing fibers-1 | Reinforcing fibers-1 | Reinforcing fibers-1 |
| | Sizing agent (s) | | (s)-1 | (s)-1 | (s)-1 | (s)-2 | (s)-3 | (s)-4 | (s)-1 |
| | Blending amount | Parts by mass | 20 | 20 | 20 | 20 | 20 | 20 | 20 |
| | Component (B) | Parts by mass | 5 | 5 | 5 | 5 | 5 | 5 | 5 |
| | Component (A)/component (B) | | 4/1 | 4/1 | 4/1 | 4/1 | 4/1 | 4/1 | 4/1 |
| | Melt viscosity at 150° C. | Pa·s | 0.18 | 0.04 | 0.09 | 0.18 | 0.18 | 0.18 | 0.18 |
| | Viscosity change rate after heating at 150° C. for 2 hours | — | 1 | 1 | 1 | 1 | 1 | 1 | 1 |
| | Component (B-1) | Type | (B-1)-1 | (B-1)-2 | (B-1)-3 | (B-1)-1 | (B-1)-1 | (B-1)-1 | (B-1)-1 |
| | | Parts by mass | 5 | 5 | 5 | 5 | 5 | 5 | 5 |
| | Properties of (B-1) at 50° C. | — | Liquid | Liquid | Liquid | Liquid | Liquid | Liquid | Liquid |
| | Other components | Type | — | — | — | — | — | — | — |
| | | Parts by mass | — | — | — | — | — | — | — |
| | Ratio of component (B-1) | % by mass | 100 | 100 | 100 | 100 | 100 | 100 | 100 |
| Component (C) | (C)-1 Polyphenylene sulfide | Parts by mass | 75 | 75 | 75 | 75 | 75 | 75 | — |
| | (C)-2 Polycarbonate | Parts by mass | — | — | — | — | — | — | 75 |

TABLE 1-continued

|  |  |  | | | | | | | |
|---|---|---|---|---|---|---|---|---|---|
| Production conditions for component (D) | Coating temperature of component (B) | ° C. | 150 | 100 | 120 | 150 | 150 | 150 | 150 |
|  | Deposition amount of component (B) to supply | % | 95 | 95 | 95 | 95 | 95 | 95 | 95 |
|  | Maximum temperature in step (II) | ° C. | 180 | 130 | 150 | 180 | 180 | 180 | 180 |
| Evaluation of composite fiber bundle, molding material and molded article | Void content of composite fiber bundle[(1)] | % | A | A | A | A | A | A | A |
|  | Form of molding material | — | Long fiber pellet | Long fiber pellet | Long fiber pellet | Long fiber pellet | Long fiber pellet | Long fiber pellet | Long fiber pellet |
|  | Length of molding material | — | 7 mm | 7 mm | 7 mm | 7 mm | 7 mm | 7 mm | 7 mm |
|  | Cylinder temperature during injection molding | ° C. | 320 | 320 | 320 | 320 | 320 | 320 | 300 |
|  | Die temperature during injection molding | ° C. | 150 | 150 | 150 | 150 | 150 | 150 | 120 |
|  | Bending strength[(2)] | — | A | A | A | B | C | C | B |

|  |  |  | Example 1-8 | Example 1-9 | Example 1-10 | Example 1-11 | Example 1-12 | Example 1-13 |
|---|---|---|---|---|---|---|---|---|
| Component (A) | Type | — | Reinforcing fibers-1 | Reinforcing fibers-1 | Reinforcing fibers-1 | Reinforcing fibers-1 | Reinforcing fibers-1 | Reinforcing fibers-1 |
|  | Sizing agent (s) |  | (s)-1 | (s)-1 | (s)-1 | (s)-1 | (s)-1 | (s)-1 |
|  | Blending amount | Parts by mass | 7 | 49 | 20 | 20 | 20 | 20 |
|  | Component (B) | Parts by mass | 2 | 15 | 5 | 5 | 3 | 5 |
|  | Component (A)/component (B) |  | 3.5/1 | 3.3/1 | 4/1 | 4/1 | 6.7/1 | 4/1 |
|  | Melt viscosity at 150° C. | Pa · s | 0.18 | 0.18 | 0.07 | 0.11 | 0.18 | 0.18 |
|  | Viscosity change rate after heating at 150° C. for 2 hours | — | 1 | 1 | 1.1 | 1.2 | 1 | 1 |
|  | Component (B-1) | Type | (B-1)-1 | (B-1)-1 | (B-1)-1 | (B-1)-1 | (B-1)-1 | (B-1)-1 |
|  |  | Parts by mass | 2 | 15 | 0.5 | 1.5 | 3 | 5 |
|  | Properties of (B-1) at 50° C. | — | Liquid | Liquid | Liquid | Liquid | Liquid | Liquid |
|  | Other components | Type | — | — | (B-3)-1 | (B-3)-1 | — | — |
|  |  | Parts by mass | — | — | 4.5 | 3.5 | — | — |
|  | Ratio of component (B-1) | % by mass | 100 | 100 | 10 | 30 | 100 | 100 |
| Component (C) | (C)-1 Polyphenylene sulfide | Parts by mass | 91 | 34 | 75 | 75 | 77 | 75 |
|  | (C)-2 Polycarbonate | Parts by mass | — | — | — | — | — | — |
| Production conditions for component (D) | Coating temperature of component (B) | ° C. | 150 | 150 | 120 | 120 | 150 | 50 |
|  | Deposition amount of component (B) to supply | % | 95 | 95 | 95 | 95 | 95 | 85 |
|  | Maximum temperature in step (II) | ° C. | 180 | 180 | 150 | 150 | 180 | 150 |
| Evaluation of composite fiber bundle, molding material and molded article | Void content of composite fiber bundle[(1)] | % | A | A | A | A | C | B |
|  | Form of molding material | — | Long fiber pellet | Long fiber pellet | Long fiber pellet | Long fiber pellet | Long fiber pellet | Long fiber pellet |
|  | Length of molding material | — | 7 mm | 7 mm | 7 mm | 7 mm | 7 mm | 7 mm |
|  | Cylinder temperature during injection molding | ° C. | 320 | 320 | 320 | 320 | 320 | 320 |
|  | Die temperature during injection molding | ° C. | 150 | 150 | 150 | 150 | 150 | 150 |
|  | Bending strength[(2)] | — | C | B | C | B | B | A |

[(1)]A: 0 to less than 5%, B: 5% or more and less than 20%, C: 20% or more and less than 40%, D: 40% or more
[(2)]A: 300 MPa or more, B: 270 MPa or more and less than 300 MPa, C: 240 MPa or more and less than 270 MPa, D: less than 240 MPa

TABLE 2

|  |  |  | Comparative Example 1-1 | Comparative Example 1-2 | Comparative Example 1-3 | Comparative Example 1-4 | Comparative Example 1-5 | Comparative Example 1-6 |
|---|---|---|---|---|---|---|---|---|
| Component (A) | Type | — | Reinforcing fibers-1 | Reinforcing fibers-1 | Reinforcing fibers-1 | Reinforcing fibers-1 | Reinforcing fibers-1 | Reinforcing fibers-1 |

TABLE 2-continued

|  |  |  |  |  |  |  |  |
|---|---|---|---|---|---|---|---|
|  | Sizing agent (s) |  | (s)-1 | (s)-1 | (s)-1 | (s)-1 | (s)-1 | — |
|  | Blending amount | Parts by mass | 20 | 20 | 20 | 20 | 20 | 20 |
|  | Component (B) | Parts by mass | 5 | 5 | 5 | 5 | — | 5 |
|  | Component (A)/component (B) |  | 4/1 | 4/1 | 4/1 | 4/1 | — | 4/1 |
|  | Melt viscosity at 150° C. | Pa · s | 1000 | 0.49 | 0.01 | 0.01 | — | 0.18 |
|  | Viscosity change rate after heating at 150° C. for 2 hours | — | 1.2 | 1 | 1 | 1 | — | 1 |
|  | Component (B-1) | Type | — | — | — | — | — | (B-1)-1 |
|  |  | Parts by mass | — | — | — | — | — | 5 |
|  | Properties of (B-1) at 50° C. | — | — | — | — | — | — | Liquid |
|  | Other components | Type | (B-2)-1 | (B-2)-2 | (B-3)-2 | (B-3)-1 | — | — |
|  |  | Parts by mass | 5 | 5 | 5 | 5 | — | — |
|  | Ratio of component (B-1) | % by mass | 0 | 0 | 0 | 0 | — | 100 |
| Component (C) | (C)-1 Polyphenylene sulfide | Parts by mass | 75 | 75 | 75 | 75 | 80 | 75 |
|  | (C)-2 Polycarbonate | Parts by mass | — | — | — | — | — | — |
| Production conditions for component (D) | Coating temperature of component (B) | ° C. | 150 | 150 | 50 | 120 | — | 150 |
|  | Deposition amount of component (B) to supply | % | Coating impossible | 90 | 70 | 95 | — | 85 |
|  | Maximum temperature in step (II) | ° C. | — | 180 | 100 | 150 | — | 180 |
| Evaluation of composite fiber bundle, molding material and molded article | Void content of composite fiber bundle(1) | % | — | B | D | A | — | C |
|  | Form of molding material | — | — | Long fiber pellet | Long fiber pellet | Long fiber pellet | Production impossible | Long fiber pellet |
|  | Length of molding material | — | — | 7 mm | 7 mm | 7 mm | — | 7 mm |
|  | Cylinder temperature during injection molding | ° C. | — | 320 | 320 | 320 | — | 320 |
|  | Die temperature during injection molding | ° C. | — | 150 | 150 | 150 | — | 150 |
|  | Bending strength(2) | — | — | C | D | D | — | D |

|  |  |  | Comparative Example 1-7 | Comparative Example 1-8 | Comparative Example 1-9 | Comparative Example 1-10 |
|---|---|---|---|---|---|---|
| Component (A) | Type |  | — | Reinforcing fibers-1 | Reinforcing fibers-1 | Reinforcing fibers-1 | Reinforcing fibers-1 |
|  | Sizing agent (s) |  | (s)-4 | (s)-1 | (s)-1 | (s)-1 |
|  | Blending amount | Parts by mass | 20 | 7 | 49 | 20 |
|  | Component (B) | Parts by mass | 5 | 2 | 15 | 5 |
|  | Component (A)/component (B) |  | 4/1 | 3.5/1 | 3.3/1 | 4/1 |
|  | Melt viscosity at 150° C. | Pa · s | 0.01 | 0.18 | 0.18 | 0.20 |
|  | Viscosity change rate after heating at 150° C. for 2 hours | — | 1 | 1 | 1 | Cured |
|  | Component (B-1) | Type | — | — | — | — |
|  |  | Parts by mass | — | — | — | — |
|  | Properties of (B-1) at 50° C. | — | — | — | — | — |
|  | Other components | Type | (B-3)-1 | (B-3)-1 | (B-3)-1 | (B-3)-3 |
|  |  | Parts by mass | 5 | 5 | 5 | 5 |
|  | Ratio of component (B-1) | % by mass | 0 | 0 | 0 | 0 |
| Component (C) | (C)-1 Polyphenylene sulfide | Parts by mass | 75 | 91 | 34 | 75 |
|  | (C)-2 Polycarbonate | Parts by mass | — | — | — | — |
| Production conditions for component (D) | Coating temperature of component (B) | ° C. | 120 | 120 | 120 | 120 |
|  | Deposition amount of component (B) to supply | % | 95 | 95 | 95 | Coating impossible |
|  | Maximum temperature in step (II) | ° C. | 150 | 150 | 150 | — |

TABLE 2-continued

| | | | | | | |
|---|---|---|---|---|---|---|
| Evaluation of composite fiber bundle, molding material and molded article | Void content of composite fiber bundle[1] | % | A | A | A | — |
| | Form of molding material | — | Long fiber pellet | Long fiber pellet | Long fiber pellet | — |
| | Length of molding material | — | 7 mm | 7 mm | 7 mm | — |
| | Cylinder temperature during injection molding | °C. | 320 | 320 | 320 | — |
| | Die temperature during injection molding | °C. | 150 | 150 | 150 | — |
| | Bending strength[2] | — | D | D | C | — |

[1]A: 0 to less than 5%, B: 5% or more and less than 20%, C: 20% or more and less than 40%, D: 40% or more
[2]A: 300 MPa or more, B: 270 MPa or more and less than 300 MPa, C: 240 MPa or more and less than 270 MPa, D: less than 240 Mpa As described above, in Examples 1-1 to 1-13, the impregnation property of the component (B) to the reinforcing fibers (A) is satisfactory even at 200° C. or lower, and a molding material excellent in productivity was obtained. A molded article formed by molding the obtained molding material exhibited high bending strength, and had excellent dynamic characteristics.

On the other hand, in Comparative Examples 1-1 to 1-10, when a molding material was to be produced at an impregnation temperature of 200° C. or lower, it was not able to produce a molding material, or it was able to produce a molding material, but the bending strength of the molded article was lower as compared to Examples 1-1 to 1-13 and, thus, a molding material having both productivity and good dynamic characteristics was not obtained.

Examples 2-1 to 2-14, Comparative Examples 2-1 to 2-3 and Comparative Example 2-5

With the compositions described in Tables 3 and 4 and under the conditions shown in the tables, long fiber pellets were prepared in accordance with Reference Examples 1 to 3, and test pieces for evaluation of properties (molded articles) were formed by injection molding in accordance with Reference Example 4. In any of the examples and the comparative examples, the process in Reference Example 2 and the process in Reference Example 3 were continuously carried out online.

The evaluation results are collectively shown in Tables 3 and 4.

Comparative Example 2-4

With the composition described in Table 4 and under the conditions shown in the table, the component (B) was not used, and reinforcing fibers (A) with a sizing agent deposited thereon in accordance with Reference Example 1 were directly used in place of the composite fiber bundle (D) of Reference Example 3 to prepare a long fiber pellet. The impregnation property of the component (C) to the reinforcing fiber bundle was poor so that fuzz occurred considerably during pelletization and, thus, a molding material was not obtained.

TABLE 3

| | | | Example 2-1 | Example 2-2 | Example 2-3 | Example 2-4 | Example 2-5 | Example 2-6 | Example 2-7 | Example 2-8 |
|---|---|---|---|---|---|---|---|---|---|---|
| Component (A) | Type | — | Reinforcing fibers-1 | Reinforcing fibers-1 | Reinforcing fibers-1 | Reinforcing fibers-1 | Reinforcing fibers-1 | Reinforcing fibers-1 | Reinforcing fibers-1 | Reinforcing fibers-1 |
| | Sizing agent (s) | | (s)-1 | (s)-1 | (s)-1 | (s)-2 | (s)-3 | (s)-4 | (s)-1 | (s)-1 |
| | Blending amount | Parts by mass | 20 | 20 | 20 | 20 | 20 | 20 | 20 | 7 |
| Component (B) | | Parts by mass | 5 | 5 | 5 | 5 | 5 | 5 | 5 | 2 |
| | Component (A)/component (B) | | 4/1 | 4/1 | 4/1 | 4/1 | 4/1 | 4/1 | 4/1 | 3.5/1 |
| | Component (B-2) | Type | (B-2)-1 | (B-2)-2 | (B-2)-1 | (B-2)-1 | (B-2)-1 | (B-2)-1 | (B-2)-1 | (B-2)-1 |
| | | Parts by mass | 5 | 5 | 1.0 | 1.0 | 1.0 | 1.0 | 1.0 | 0.4 |
| | | Type | — | — | (B-2)-2 | (B-2)-2 | (B-2)-2 | (B-2)-2 | (B-2)-2 | (B-2)-2 |
| | | Parts by mass | — | — | 4.0 | 4.0 | 4.0 | 4.0 | 4.0 | 1.6 |
| | Other components | Type | — | — | — | — | — | — | — | — |
| | | Parts by mass | — | — | — | — | — | — | — | — |
| | Ratio of component (B-2) | % by mass | 100 | 100 | 100 | 100 | 100 | 100 | 100 | 100 |
| Component (C) | (C)-1 Polyphenylene sulfide | Parts by mass | 75 | 75 | 75 | 75 | 75 | 75 | — | 91 |
| | (C)-2 Polycarbonate | Parts by mass | — | — | — | — | — | — | 75 | — |
| Production conditions for component (D) | Coating temperature of component (B) | °C. | 230 | 150 | 200 | 200 | 200 | 200 | 200 | 200 |
| | Deposition amount of component (B) to supply | % | 75 | 95 | 95 | 95 | 95 | 95 | 95 | 95 |
| | Maximum temperature in step (II) | °C. | 250 | 200 | 250 | 250 | 250 | 250 | 250 | 250 |

TABLE 3-continued

|  |  |  |  |  |  |  |  |  |  |
|---|---|---|---|---|---|---|---|---|---|
| Evaluation of molding material and molded article | Form of molding material | — | Long fiber pellet | Long fiber pellet | Long fiber pellet | Long fiber pellet | Long fiber pellet | Long fiber pellet | Long fiber pellet |
|  | Length of molding material | — | 7 mm | 7 mm | 7 mm | 7 mm | 7 mm | 7 mm | 7 mm |
|  | Blocking resistance[1] | % | A | A | A | A | A | A | A |
|  | Cylinder temperature during injection molding | °C. | 320 | 320 | 320 | 320 | 320 | 300 | 320 |
|  | Die temperature during injection molding | °C. | 150 | 150 | 150 | 150 | 150 | 120 | 150 |
|  | Bending strength[2] | — | B | C | A | B | C | C | B | C |

|  |  |  |  | Example 2-9 | Example 2-10 | Example 2-11 | Example 2-12 | Example 2-13 | Example 2-14 |
|---|---|---|---|---|---|---|---|---|---|
|  | Component (A) | Type | — | Reinforcing fibers-1 | Reinforcing fibers-1 | Reinforcing fibers-1 | Reinforcing fibers-1 | Reinforcing fibers-1 | Reinforcing fibers-1 |
|  |  | Sizing agent (s) |  | (s)-1 | (s)-1 | (s)-1 | (s)-1 | (s)-1 | (s)-1 |
|  |  | Blending amount | Parts by mass | 49 | 20 | 20 | 20 | 20 | 20 |
|  | Component (B) |  | Parts by mass | 15 | 5 | 5 | 5 | 3 | 5 |
|  |  | Component (A)/component (B) |  | 3.3/1 | 4/1 | 4/1 | 4/1 | 6.7/1 | 4/1 |
|  |  | Component (B-2) | Type | (B-2)-1 | (B-2)-2 | (B-2)-2 | (B-2)-2 | (B-2)-1 | (B-2)-1 |
|  |  |  | Parts by mass | 3.0 | 0.5 | 1.5 | 4.0 | 0.6 | 1.0 |
|  |  |  | Type | (B-2)-2 | — | — | — | (B-2)-2 | (B-2)-2 |
|  |  |  | Parts by mass | 12 | — | — | — | 2.4 | 4.0 |
|  |  | Other components | Type | — | (B-1)-2 | (B-1)-2 | (B-1)-2 | — | — |
|  |  |  | Parts by mass | — | 4.5 | 3.5 | 1.0 | — | — |
|  |  | Ratio of component (B-2) | % by mass | 100 | 10 | 30 | 80 | 100 | 100 |
|  | Component (C) | (C)-1 Polyphenylene sulfide | Parts by mass | 34 | 75 | 75 | 75 | 77 | 75 |
|  |  | (C)-2 Polycarbonate | Parts by mass | — | — | — | — | — | — |
|  | Production conditions for component (D) | Coating temperature of component (B) | °C. | 200 | 100 | 125 | 150 | 200 | 200 |
|  |  | Deposition amount of component (B) to supply | % | 95 | 95 | 95 | 95 | 95 | 85 |
|  |  | Maximum temperature in step (II) | °C. | 250 | 150 | 175 | 200 | 250 | 250 |
|  | Evaluation of molding material and molded article | Form of molding material | — | Long fiber pellet | Long fiber pellet | Long fiber pellet | Long fiber pellet | Long fiber pellet | Long fiber pellet |
|  |  | Length of molding material | — | 7 mm | 7 mm | 7 mm | 7 mm | 7 mm | 7 mm |
|  |  | Blocking resistance[1] | % | A | C | B | A | A | A |
|  |  | Cylinder temperature during injection molding | °C. | 320 | 320 | 320 | 320 | 320 | 320 |
|  |  | Die temperature during injection molding | °C. | 150 | 150 | 150 | 150 | 150 | 150 |
|  |  | Bending strength[2] | — | B | A | A | B | B | A |

[1]A: 100%, B: 90% or more and less than 100%, C: 70% or more and less than 90%, D: less than 70%
[2]A: 300 MPa or more, B: 270 MPa or more and less than 300 MPa, C: 240 MPa or more and less than 270 MPa, D: less than 240 Mpa

TABLE 4

|  |  |  | Comparative Example 2-1 | Comparative Example 2-2 | Comparative Example 2-3 | Comparative Example 2-4 | Comparative Example 2-5 |
|---|---|---|---|---|---|---|---|
| Component (A) | Type | — | Reinforcing fibers-1 | Reinforcing fibers-1 | Reinforcing fibers-1 | Reinforcing fibers-1 | Reinforcing fibers-1 |
|  | Sizing agent (s) |  | (s)-1 | (s)-1 | (s)-1 | (s)-1 | — |
|  | Blending amount | Parts by mass | 20 | 20 | 20 | 20 | 20 |
| Component (B) |  | Parts by mass | 5 | 5 | 5 | — | 5 |
|  | Component (A)/component (B) |  | 4/1 | 4/1 | 4/1 | — | 4/1 |
|  | Component (B-2) | Type | — | — | — | — | (B-2)-1 |
|  |  | Parts by mass | — | — | — | — | 1.0 |

TABLE 4-continued

|  |  |  | Comparative Example 2-1 | Comparative Example 2-2 | Comparative Example 2-3 | Comparative Example 2-4 | Comparative Example 2-5 |
|---|---|---|---|---|---|---|---|
|  |  | Type | — | — | — | — | (B-2)-2 |
|  |  | Parts by mass | — | — | — | — | 4.0 |
|  | Other components | Type | (B-1)-2 | (B-3)-1 | (B-3)-2 | — | — |
|  |  | Parts by mass | 5 | 5 | 5 | — | — |
|  | Ratio of component (B-2) | % by mass | 0 | 0 | 0 | — | 100 |
| Component (C) | (C)-1 Polyphenylene sulfide | Parts by mass | 75 | 75 | 75 | 80 | 75 |
|  | (C)-2 Polycarbonate | Parts by mass | — | — | — | — | — |
| Production conditions for component (D) | Coating temperature of component (B) | ° C. | 100 | 120 | 50 | — | 200 |
|  | Deposition amount of component (B) to supply | % | 95 | 95 | 70 | — | 85 |
|  | Maximum temperature in step (II) | ° C. | 130 | 150 | 100 | — | 250 |
| Evaluation of molding material and molded article | Form of molding material | — | Long fiber pellet | Long fiber pellet | Long fiber pellet | Production impossible | Long fiber pellet |
|  | Length of molding material | — | 7 mm | 7 mm | 7 mm | — | 7 mm |
|  | Blocking resistance[(1)] | % | D | D | D | — | A |
|  | Cylinder temperature during injection molding | ° C. | 320 | 320 | 320 | — | 320 |
|  | Die temperature during injection molding | ° C. | 150 | 150 | 150 | — | 150 |
|  | Bending strength[(2)] | — | A | D | D | — | D |

[(1)]A: 100%, B: 90% or more and less than 100%, C: 70% or more and less than 90%, D: less than 70%
[(2)]A: 300 MPa or more, B: 270 MPa or more and less than 300 MPa, C: 240 MPa or more and less than 270 MPa, D: less than 240 MPa As described above, in Examples 2-1 to 2-14, a molding material having good blocking resistance and excellent handling characteristics was obtained. A molded article formed by molding the obtained molding material exhibited high bending strength, and had excellent dynamic characteristics.

On the other hand, in Comparative Examples 2-1 to 2-5, it was not able to produce a molding material, or it was able to produce a molding material, but the blocking resistance of the molding material or the bending strength of the molded article was lower as compared to Examples 2-1 to 2-14 and, thus, a molding material having both handling characteristics and good dynamic characteristics was not obtained.

Example 3-1

Using the thermoplastic resin (C-1) and the polycarbodiimide compound (B-2)-3, a master batch was prepared in accordance with the following procedure.

The thermoplastic resin (C-1) and the polycarbodiimide compound (B-2)-3 were main-fed, and melted and kneaded using a twin-screw extruder (TEX-30α from JSW, Inc., L/D=31.5). The melting and kneading was performed at a cylinder temperature of 300° C., a screw rotation number of 150 rpm and a discharge rate of 10 kg/hour. The discharged product was taken out and, simultaneously, cooled by a water cooling bath to form a gut, and the gut was cut to form the master batch into a columnar pellet. The results of measuring the long diameter of the cross section and the aspect ratio are shown in Table 5. The results of evaluating the obtained master batch (M-1) are shown in Table 5.

Example 3-2

Using the thermoplastic resin (C-2) and the polycarbodiimide compound (B-2)-3, a master batch was prepared in accordance with the following procedure.

A film of a liquid obtained by heating and melting the polycarbodiimide compound (B-2)-3 was formed on a roll heated to 110° C. A kiss coater was used for forming a film on the roll in a constant thickness. The thermoplastic resin (C-2) having a width of 3 cm was caused to pass over the roll while being in contact with the roll so that the polycarbodiimide compound (B-2)-3 was deposited on the thermoplastic resin (C-2). Next, the thermoplastic resin (C-2) with the polycarbodiimide compound (B-2)-3 deposited thereon was twisted to have a rod-like shape, and caused to pass alternately over and under ten rolls which were heated to 130° C., freely rotated by a bearing, and arranged on a straight line, and had a diameter of 50 mm. Through this operation, the nonwoven fabric was impregnated with the polycarbodiimide compound (B-2)-3 up to the inside thereof, and air-cooled, and the gut was then cut to form the master batch into a columnar pellet. The measurement and evaluation results are shown in Table 5.

Example 3-3

Except that the thermoplastic resin (C-2) was changed to the thermoplastic resin (C-3), the same procedure as in Example 3-2 was carried out to obtain a master batch. The measurement and evaluation results are shown in Table 5.

Example 3-4

Except that the thermoplastic resin (C-1) was changed to the thermoplastic resin (C-4), and the cylinder temperature during melting and kneading was changed to 330° C., the same procedure as in Example 3-1 was carried out to obtain a master batch. The measurement and evaluation results are shown in Table 5.

Example 3-5

Except that the thermoplastic resin (C-1) was changed to the thermoplastic resin (C-5), the carbodiimide compound (B-2)-3 was changed to the polycarbodiimide compound (B-2)-4, and the cylinder temperature during melting and kneading was changed to 390° C., the same procedure as in Example 3-1 was carried out to obtain a master batch. The measurement and evaluation results are shown in Table 5.

Example 3-6

Except that the carbodiimide compound (B-2)-3 was changed to the polycarbodiimide compound (B-2)-2, the same procedure as in Example 3-1 was carried out to obtain a master batch. The measurement and evaluation results are shown in Table 5.

Example 3-7

As the component (E), a polyurea compound (E-1) was obtained by immersing the polycarbodiimide compound (B-2)-4 in hot water at 80° C. for 5 days to convert carbodiimide into urea. Conversion of carbodiimide into urea was confirmed by disappearance of an absorption peak of carbodiimide in IR spectrum measurement of the compound.

Except that the obtained polyurea compound (E-1) was added, the composition ratio of the thermoplastic resin (C-1) to the polycarbodiimide compound (B-2)-2 was changed as shown in Table 5, and these components were main-fed, the same procedure as in Example 3-6 was carried out to obtain a master batch. The measurement and evaluation results are shown in Table 5.

Comparative Example 3-1

Except that the composition ratio of the thermoplastic resin (C-1) to the polycarbodiimide compound (B-2)-3 was changed as shown in Table 5, the same procedure as in Example 3-1 was carried out to obtain a master batch. The measurement and evaluation results are shown in Table 5.

Comparative Example 3-2

The thermoplastic resin (C-1) was subjected to extrusion molding using an extruder so that a belt-shaped gut having a rectangular cross section with a width of 3 mm was formed. A master batch was then obtained in the following manner: the polycarbodiimide compound (B-2)-3 melted in a pot of a hot melt apparatus heated to 110° C. was applied onto the belt-shaped gut, air cooling was performed, and the gut was then cut into a columnar pellet. The measurement and evaluation results are shown in Table 5.

Comparative Example 3-3

Except that the screw rotation number was changed from 150 rpm to 250 rpm, the same procedure as in Example 3-1 was carried out to obtain a master batch. The measurement and evaluation results are shown in Table 5.

TABLE 5

| | | Example 3-1 | Example 3-2 | Example 3-3 | Example 3-4 | Example 3-5 | Example 3-6 |
|---|---|---|---|---|---|---|---|
| Component (C) | Resin type | C-1 | C-2 | C-3 | C-4 | C-5 | C-1 |
| | Composition ratio [% by mass] | 70 | 70 | 70 | 70 | 70 | 70 |
| Component (B') | Resin type | (B-2)-3 | (B-2)-3 | (B-2)-3 | (B-2)-3 | (B-2)-4 | (B-2)-2 |
| | Composition ratio [% by mass] | 30 | 30 | 30 | 30 | 30 | 30 |
| Component (E) | Resin type | — | — | — | — | — | — |
| | Composition ratio [% by mass] | — | — | — | — | — | — |
| | Morphology (structure) | Sea-island structure | — | — | Sea-island structure | Sea-island structure | Sea-island structure |
| | | — | Continuous structure | Continuous structure | — | — | — |
| | Average particle size [μm] | 30 | — | — | 30 | 40 | 50 |
| | Average thickness [μm] | — | 50 | 50 | — | — | — |
| | Exposure degree of (B') (Sb/S) × 100[%] | 10 | 40 | 20 | 10 | 10 | 25 |
| | (Vb/V) × 100[%] | 28 | 28 | 28 | 36 | 35 | 36 |
| | Shape | Cylindrical | Cylindrical | Cylindrical | Cylindrical | Cylindrical | Cylindrical |
| | Long diameter of cross section [μm] | 3 | 3 | 3 | 3 | 3 | 3 |
| | Aspect ratio | 2 | 2 | 2 | 2 | 2 | 2 |
| | Long diameter/short diameter ratio | 1.5 | 1.5 | 1.5 | 1.5 | 1.5 | 1.5 |
| | Thermal weight decrease [%] | 5 | 5 | 5 | 5 | 2 | 5 |
| Evaluation | Flow time | excellent | fair | good | excellent | excellent | good |
| | Blocking property | excellent | good | good | excellent | excellent | good |
| | Moisture absorption property deterioration rate | excellent | fair | good | excellent | excellent | good |

TABLE 5-continued

|   |   | Example 3-7 | Comparative Example 3-1 | Comparative Example 3-2 | Comparative Example 3-3 |
|---|---|---|---|---|---|
| Component (C) | Resin type | C-1 | C-1 | C-1 | C-1 |
|  | Composition ratio [% by mass] | 70 | 30 | 70 | 70 |
| Component (B') | Resin type | (B-2)-2 | (B-2)-3 | (B-2)-3 | (B-2)-3 |
|  | Composition ratio [% by mass] | 20 | 70 | 30 | 30 |
| Component (E) | Resin type | E-1 | — | — | — |
|  | Composition ratio [% by mass] | 10 | — | — | — |
|  | Morphology (structure) | Sea-island structure | — | — | Sea-island structure |
|  |  | — | Continuous structure | Continuous structure | — |
|  | Average particle size [μm] | 40 | — | — | 0.3 |
|  | Average thickness [μm] | — | 300 | 1000 | — |
|  | Exposure degree of (B') (Sb/S) × 100[%] | 20 | 90 | 30 | 30 |
|  | (Vb/V) × 100[%] | 36 | 28 | 28 | 28 |
|  | Shape | Cylindrical | Cylindrical | Cylindrical | Cylindrical |
|  | Long diameter of cross section [μm] | 3 | 3 | 3 | 3 |
|  | Aspect ratio | 2 | 2 | 2 | 2 |
|  | Long diameter/short diameter ratio | 1.5 | 1.5 | 1.5 | 1.5 |
|  | Thermal weight decrease [%] | 5 | 5 | 5 | 5 |
| Evaluation | Flow time | good | bad | bad | fair |
|  | Blocking property | good | bad | fair | fair |
|  | Moisture absorption property deterioration rate | excellent | bad | bad | bad |

The examples and the comparative examples in Table 5 have showed the following.

Example 3-1 and Examples 3-4 to 3-7 satisfy all the requirements in the first example of the master batch, and are therefore excellent in handling characteristics in a high-temperature process, and excellent in functional stability during storage.

Example 3-2 and Example 3-3 satisfy all the requirements in the second example of the master batch, and are therefore excellent in handling characteristics in a high-temperature process, and excellent in functional stability during storage.

A comparison between Example 3-1 and Examples 3-4 and 3-5 shows that even when the thermoplastic resin (C) is changed, the master batch is excellent in handling characteristics and functional stability and, therefore, the thermoplastic resin (C) suitable for a matrix resin that forms a resin composition or fiber-reinforced resin composition produced using the master batch can be selected.

A comparison between Example 3-1 and Example 3-6 shows that even when the polycarbodiimide compound (B') is changed, the master batch is excellent in handling characteristics and functional stability and, therefore, the polycarbodiimide compound (B') suitable for a matrix resin and reinforcing fibers that form a resin composition or fiber-reinforced resin composition produced using the master batch can be selected.

A comparison between Example 3-6 and Example 3-7 shows that when the polyurea compound (E) is contained, deterioration of properties during moisture absorption can be suppressed while handling characteristics are maintained.

It is apparent that in Comparative Example 3-1, the composition ratio of the polycarbodiimide compound (B') is high, and the exposure degree at the surface of the master pellet is high so that the master batch has poor handling characteristics in a high-temperature molding process, and suffers significant deterioration of properties during moisture absorption, thus, having a problem in functional stability.

It is apparent that in Comparative Example 3-2, the polycarbodiimide compound (B') has a large average thickness, the master batch is separated into two layers during handling, and blocking and bridging easily occur.

It is apparent that in Comparative Example 3-3, the polycarbodiimide compound (B') has a small average particle size, and the reaction excessively proceeds so that handling characteristics are deteriorated, and properties are degraded not only during moisture absorption but also during drying.

Example 3-8

A fiber-reinforced resin composition and a molded article were obtained in accordance with the following procedure using the master batch (M-1) prepared in Example 3-1, the thermoplastic resin (C-1), and a chopped strand obtained by cutting carbon fibers "TORAYCA (registered trademark)" T700SC-12K-50C (manufactured by Toray Industries, Inc.) to a length of 6 mm as reinforcing fibers.

For the fiber-reinforced resin composition, the master batch (M-1) and the thermoplastic resin (C-1) were added in a container and dry-blended such that the content of the thermoplastic resin (C) was 76% by mass, the content of the polycarbodiimide compound (B') was 4% by mass, and the content of reinforcing fibers was 20% by mass. The dry-blended resin pellet was main-fed, the chopped strand was side-fed, and the components were melted and kneaded using a twin-screw extruder (TEX-30α from JSW, Inc., L/D=31.5). The melting and kneading was performed at a cylinder temperature of 300° C., a screw rotation number of 150 rpm and a discharge rate of 10 kg/hour. The discharged product was taken out, and simultaneously cooled by a water cooling bath to form a gut, and the gut was cut to a length of 6 mm to form a fiber-reinforced resin pellet.

Using an injection molding machine (J150EII-P from JSW, Inc.), injection molding of the fiber-reinforced resin pellet was performed to prepare a fiber-reinforced resin molded article for evaluation. The injection molding was performed at a cylinder temperature of 320° C. and a die temperature of 150° C. The obtained molded article was annealed at 150° C. for 2 hours, then air-cooled, and evaluated.

We confirmed that when the master batch was used, blocking and bridging did not occur in the vicinity of a hopper in main feed at the time when kneading was performed in a twin-screw extruder and, thus, excellent handling characteristics were obtained. We also confirmed that a molded article composed of a fiber-reinforced resin composition produced using the master batch exhibited high dynamic characteristics.

INDUSTRIAL APPLICABILITY

In the molding material, a composite fiber bundle with reinforcing fibers impregnated with a component containing a polycarbodiimide compound that is liquid at 50° C. is coated with a thermoplastic resin containing an element other than carbon in the repeating unit structure of the main chain and, thus, the molding material has a good impregnation property to a reinforcing fiber bundle at 200° C. or lower, and is extremely excellent in productivity. In the molding material, a composite fiber bundle with reinforcing fibers impregnated with a component containing a polycarbodiimide compound that is solid at 50° C. is coated with a thermoplastic resin containing an element other than carbon in the repeating unit structure of the main chain, and thus the molding material is excellent in blocking resistance, and excellent in handling characteristics.

The molding material is excellent in molding processability so that a molded article excellent in dynamic characteristics, particularly bending strength, can be obtained, and thus the molding material can be used in various applications. The molding material is suitable particularly for automobile components, electric/electronic components and home/office electric appliance components.

The master batch can exhibit dramatically improved handling characteristics in a high-temperature molding process as compared to conventional products. Further, the master batch is a master batch which inhibits blocking and bridging from occurring, thus is excellent in handling characteristics, the master batch having functional stability during storage while ensuring that the content of additives can be increased by defining the morphology of the component (A) and the component (B'). Accordingly, the master batch can be used in fiber-reinforced resin compositions and molded articles that are suitably used in electronic device cases, electric and electronic component applications, automobile components, vehicle related components, building materials, sports goods and so on.

The invention claimed is:
1. A molding material comprising:
   5 to 50 parts by mass of reinforcing fibers (A) with a sizing agent (s) deposited thereon;
   1 to 20 parts by mass of a component (B) containing a polycarbodiimide compound (B-1) that is liquid at 50° C. or a polycarbodiimide compound (B-2) that is solid at 50° C.; and
   30 to 94 parts by mass of a thermoplastic resin (C) containing an element other than carbon in a repeating unit structure of a main chain,
   based on 100 parts by mass of the total of the components (A) to (C),
   wherein the molding material is a composite comprising 1) the component (C) and 2) a composite fiber bundle (D) comprising the component (A) impregnated with the component (B) covered by the component (C).
2. The molding material according to claim 1, wherein the molding material has a length of 1 to 50 mm.
3. The molding material according to claim 1, wherein a mass ratio of the component (A) to the component (B) (component (A)/component (B)) is 5/1 to 3/1.
4. The molding material according to claim 1, wherein the component (B) includes 20 to 100% by mass of a component (B-1) or (B-2).
5. The molding material according to claim 1, wherein the polycarbodiimide compound (B-1) or (B-2) is an aliphatic polycarbodiimide.
6. The molding material according to claim 1, wherein the component (C) is at least one thermoplastic resin selected from the group consisting of polycarbonate, polyester, polyarylene sulfide, polyamide, polyoxymethylene, polyether imide, polyether sulfone, polyether ketone, polyether ether ketone and polyether ketone ketone.
7. The molding material according to claim 1, wherein the component (C) is a thermoplastic resin having in the molecule at least one functional group selected from the group consisting of a carboxyl group, a hydroxyl group and an amino group.
8. The molding material according to claim 1, wherein the sizing agent (s) is a compound having two or more functional groups in one molecule, the functional group being at least one selected from the group consisting of a carboxyl group, a hydroxyl group, an amino group and an epoxy group.
9. The molding material according to claim 1, wherein the component (A) is carbon fibers.
10. A method of producing the molding material according to claim 1, the method comprising: bringing the component (C) into contact with the composite fiber bundle (D) to obtain a composite, the composite fiber bundle (D) being prepared by bringing the component (B) in a molten state at 50 to 300° C. into contact with the component (A), and performing heating to impregnate the component (A) with 80 to 100% by mass of the supply of the component (B).
11. The method according to claim 10, further comprising cutting the composite to a length of 1 to 50 mm after obtaining the composite by bringing the component (C) into contact with the composite fiber bundle (D).
12. A method of producing the molding material according to claim 1, comprising molding a master batch including: 40 to 90% by mass of the at least one thermoplastic resin selected from the group consisting of polycarbonate, polyester, polyarylene sulfide, polyamide, polyoxymethylene, polyether imide, polyether sulfone, polyether ketone, polyether ether ketone and polyether ketone ketone as the component (C); and 10 to 60% by mass of the polycarbo- diimide compound having two or more carbodiimide groups in one molecule as a component (B'), the master batch satisfying either one of the following requirements (i) and (ii):
- (i) a morphology of a sea-island structure in which the component (B') is dispersed in the component (C), and the average particle size of the dispersed particles of the component (B') is 1 to 100 µm; and
- (ii) a morphology in which the component (B') has a continuous structure, and the average thickness of a continuous phase is 1 to 100 µm.

* * * * *